United States Patent
Singh et al.

(10) Patent No.: US 12,111,836 B2
(45) Date of Patent: Oct. 8, 2024

(54) GENERATING CONSOLIDATED VISUAL REPRESENTATIONS FOR USER JOURNEYS VIA PROFILE TRACING

(71) Applicant: Adobe Inc., San Jose, CA (US)

(72) Inventors: Mandeep Singh, Bhiwadi (IN); Shiladitya Bose, Noida (IN); Saurabh Garg, New Delhi (IN); Mukul Lamba, Shimla (IN); Kaushal Mishra, Bangalore (IN)

(73) Assignee: Adobe Inc., San Jose, CA (US)

( * ) Notice: Subject to any disclaimer, the term of this patent is extended or adjusted under 35 U.S.C. 154(b) by 65 days.

(21) Appl. No.: 18/049,883

(22) Filed: Oct. 26, 2022

(65) Prior Publication Data

US 2024/0143597 A1    May 2, 2024

(51) Int. Cl.
*G06F 3/048* (2013.01)
*G06F 3/0481* (2022.01)
*G06F 16/22* (2019.01)
*G06F 16/23* (2019.01)
*G06F 16/2457* (2019.01)

(52) U.S. Cl.
CPC .......... *G06F 16/2457* (2019.01); *G06F 3/048* (2013.01); *G06F 3/0481* (2013.01); *G06F 16/2228* (2019.01); *G06F 16/23* (2019.01)

(58) Field of Classification Search
CPC .. G06F 16/2457; G06F 16/23; G06F 16/2228; G06F 3/048; G06F 3/0481
See application file for complete search history.

(56) References Cited

U.S. PATENT DOCUMENTS

| | | | |
|---|---|---|---|
| 11,741,089 B1* | 8/2023 | Porath | G06F 3/04842 707/725 |
| 11,741,131 B1* | 8/2023 | Dwivedi | G06F 16/2474 707/758 |
| 11,762,869 B1* | 9/2023 | Werner | G06T 11/206 707/722 |
| 12,001,426 B1* | 6/2024 | Basavaiah | G06F 16/212 |
| 2016/0210658 A1* | 7/2016 | Chittilappilly | G06Q 30/0246 |
| 2017/0039233 A1* | 2/2017 | Gauthier | G06F 3/0482 |

(Continued)

OTHER PUBLICATIONS

SAP.com; SAP Customer Experience (CX) and CRM Solutions; Date downloaded Nov. 7, 2022; https://www.sap.com/products/crm.html.

(Continued)

*Primary Examiner* — David Phantana-angkool
(74) *Attorney, Agent, or Firm* — Keller Preece PLLC

(57) ABSTRACT

The present disclosure relates to systems, methods, and non-transitory computer readable media that utilize a consolidated graphical user interface for visually presenting the state of a user profile with respect to a workflow journey. For instance, in one or more embodiments, the disclosed systems provide, for display within a graphical user interface of a client device, a visual representation of a workflow journey comprising a plurality of nodes and one or more edges connecting the plurality of nodes. Additionally, the disclosed systems receive, via the graphical user interface of the client device, an identifier associated with a user profile. The disclosed systems further modify, within the graphical user interface of the client device, the visual representation of the workflow journey to reflect a state of the user profile with respect to the workflow journey.

20 Claims, 13 Drawing Sheets

(56) References Cited

U.S. PATENT DOCUMENTS

| | | | | |
|---|---|---|---|---|
| 2021/0014250 | A1* | 1/2021 | Walsh | H04L 63/1425 |
| 2022/0293107 | A1* | 9/2022 | Leaman | G06F 16/951 |
| 2022/0398665 | A1* | 12/2022 | Jayathirtha | G06Q 40/06 |
| 2023/0161821 | A1* | 5/2023 | Beringer | G06F 16/904 |
| | | | | 707/722 |
| 2023/0316186 | A1* | 10/2023 | Miller | G06F 40/40 |
| | | | | 705/7.25 |
| 2024/0054501 | A1* | 2/2024 | Crossman | G06Q 30/0202 |
| 2024/0143597 | A1* | 5/2024 | Singh | G06F 3/048 |

OTHER PUBLICATIONS

ThunderHead by Medallia; "Our Product: Orchestrates journeys that create individualized and engaging experiences"; Date downloaded Nov. 7, 2022; https://www.thunderhead.com/our-product/?utm_source=google&utm_medium=ppc&utm_campaign=brandusa&utm_content=productpage&utm_term=thunderhead_software&matchtype=%7bE%7d&gclid=EAlalQobChMI_47__8-V-wIVkQZ9Ch2djw5xEAAYASAAEgLGXPD_BwE&gclsrc=aw.ds.

* cited by examiner

GENERATING CONSOLIDATED VISUAL REPRESENTATIONS FOR USER JOURNEYS VIA PROFILE TRACING

BACKGROUND

In recent years, computer-implemented technologies have improved software platforms that implement various approaches for engaging with their users. For instance, some existing systems consider the past behaviors and/or preferences associated with user profiles to tailor their journeys while engaging with the systems. Many of these systems further provide features for tracking the journeys of their associated user profiles, facilitating the determination of the status of a particular user profile and/or aberrations that may arise with respect to its journey. Despite these advantages, conventional profile tracking systems are typically inflexible in how they gather and present information related to the journey of a user profile, often relying on inefficient methods that require a significant amount of user interaction.

SUMMARY

This disclosure describes one or more embodiments of methods, non-transitory computer-readable media, and systems that solve one or more of the foregoing problems and provide other benefits. For example, in one or more embodiments, the disclosed systems utilize a consolidated graphical user interface to extract and present the journeys of user profiles. To illustrate, in some embodiments, the disclosed systems trace all the events of a defined journey and store associated data. The disclosed systems further extract profile related events for a profile queried via a graphical user interface by selecting, from the stored data, combinations of fields corresponding to the defined journey. To illustrate, in some embodiments, the disclosed systems utilize a profile identifier received through the graphical user interface as a filter to extract data that is relevant to the queried profile. The disclosed systems present the extracted data within a visual representation of the defined journey displayed within the graphical user interface. In this manner, the disclosed systems implement a flexible approach to presenting profile journeys using a graphical user interface that efficiently reduces the user interactions required.

Additional features and advantages of one or more embodiments of the present disclosure are outlined in the following description.

BRIEF DESCRIPTION OF THE DRAWINGS

This disclosure will describe one or more embodiments of the invention with additional specificity and detail by referencing the accompanying figures. The following paragraphs briefly describe those figures, in which.

DETAILED DESCRIPTION

Figure 1:
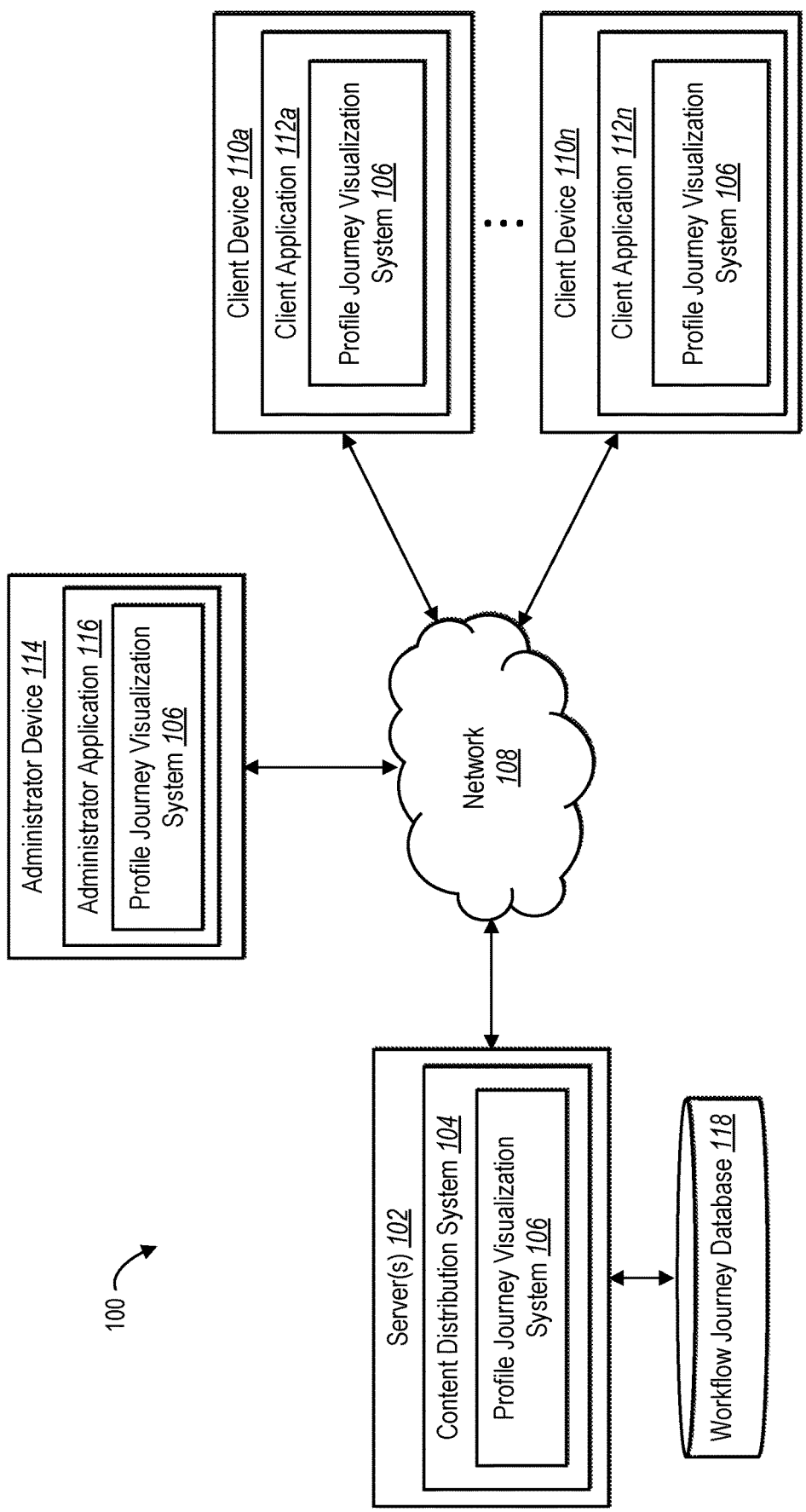
FIG. 1 illustrates an example system environment in which a profile journey visualization system can operate in accordance with one or more embodiments.

The disclosure describes one or more embodiments of a profile journey visualization system that generates and displays visual representations of defined journeys to flexibly and efficiently summarize profile data related to those journeys. Indeed, in one or more embodiments, the profile journey visualization system provides a visual representation of the progress of a user profile with respect to a defined journey. For instance, in some cases, the profile journey visualization system visually emphasizes the path of the journey taken by the profile and/or the current position of the profile within the journey. In some embodiments, the profile journey visualization system further adds context to the path and/or current position within the same graphical user interface. For example, in some implementations, the profile journey visualization system provides additional details that convey an error the profile may have encountered or an activity that must be performed before the profile advances through the journey.

To provide an illustration, in one or more embodiments, the profile journey visualization system provides, for display within a graphical user interface of a client device, a visual representation of a workflow journey comprising a plurality of nodes and one or more edges connecting the plurality of nodes. Additionally, the profile journey visualization system receives, via the graphical user interface of the client device, an identifier associated with a user profile. The profile journey visualization system further modifies, within the graphical user interface of the client device, the visual representation of the workflow journey to reflect a state of the user profile with respect to the workflow journey.

As just mentioned above, in one or more embodiments, the profile journey visualization system provides a visual representation of a workflow journey and the state of a user profile with respect to the workflow journey within a graphical user interface. Accordingly, in some embodiments the profile journey visualization system tracks and maintains workflow journey data for the user profile with respect to the workflow journey.

To illustrate, in one or more embodiments, the profile journey visualization system monitors the activity of the user profile. In particular, in some cases, the profile journey visualization system determines one or more events of the workflow journey that have occurred due to the activity of the user profile. Further, in some instances, the profile journey visualization system monitors one or more responses to the activity of the user profile. In some implementations, the profile journey visualization system determines whether an error is associated with the progress of the user profile within the workflow journey, such as a timeout error corresponding to a response to the activity of the user profile.

In one or more embodiments, the profile journey visualization system determines workflow journey data for the user profile with respect to the workflow journey based on determining the activity of the user profile, responses to the activity, and/or errors associated with the progress of the user profile. Further, the profile journey visualization system stores and maintains the workflow journey data within a storage location (e.g., a database). In some implementations, the profile journey visualization system also associates an identifier for the user profile with the workflow journey data for the user profile. Indeed, in some embodiments, the profile journey visualization system tracks and stores workflow journey data for a plurality of user profiles with respect to the workflow journey. Accordingly, in some cases, the profile journey visualization system associates an identifier for each user profile with its respective workflow journey data.

As further mentioned above, in one or more embodiments, the profile journey visualization system provides a visual representation of the workflow journey for display within a graphical user interface of a client device. For instance, in some cases, the profile journey visualization system generates a visual representation including a plurality of nodes that correspond to events of the workflow journey and/or actions (e.g., responses to events) of the workflow journey as well as edges connecting those nodes. In some cases, the workflow journey includes various paths (e.g., branching paths). Accordingly, the profile journey visualization system configures the nodes and edges to visually represent the various paths.

In one or more embodiments, the profile journey visualization system receives, through the graphical user interface, a query for workflow journey data related to the user profile. For instance, in some cases, the profile journey visualization system receives an identifier (e.g., an email address) associated with the user profile. To illustrate, in some embodiments, the profile journey visualization system provides, for display within the graphical user interface, an interactive search option for searching for workflow journey data related to a particular user profile and receives the identifier for the user profile via the interactive search option.

In one or more embodiments, in response to receiving the query for the workflow journey data, the profile journey visualization system modifies the visual representation of the workflow journey within the graphical user interface to represent the state of the user profile with respect to the workflow journey. For instance, in cases where the workflow journey includes various paths, the profile journey visualization system modifies the visual representation to visually highlight the path associated with the user profile. In some instances, the profile journey visualization system further modifies the visual representation to represent a current position of the user profile within the workflow journey.

In some implementations, the profile journey visualization system further provides additional detail regarding the state of the user profile with respect to the workflow journey for display within the graphical user interface. For instance, in some embodiments, the profile journey visualization system provides detail regarding errors associated with the progress of the user profile with respect to the workflow journey. In some cases, the profile journey visualization system provides the additional detail for simultaneous display with the visual representation of the workflow journey.

The profile journey visualization system provides advantages over conventional systems. For example, conventional profile tracking systems suffer from technological shortcomings that result in inflexible and inefficient operation. To illustrate, conventional systems are typically rigid in the approaches that are implemented to gather and present information related to the journey of a user profile. For instance, many conventional systems require a user to navigate through multiple menus, sub-menus, and/or windows of a graphical user interface to indicate that a query for information is desired and then to create and submit the query. Creating the query often requires a rigid knowledge and use of certain executable language and formatting. Other systems allow users to alternatively submit a ticket to backend engineering administrators. Such systems, however, still require a rigid and detailed knowledge for backend engineering administrators to use existing graphical user interfaces and technical, executable language to query step events from the backend, check the profile's trace in a workflow journey via detailed logging of each step at every checkpoint, or re-run scenarios repeatedly to determine the status of a user profile.

Additionally, conventional profile tacking systems often fail to operate efficiently. In particular, the various rigid approaches discussed above often require a significant amount of user interaction with graphical user interface after graphical user interface—whether from a user on the frontend or an administrator on the backend—to obtain the desired information. Indeed, the approaches implemented by such systems typically require multiple navigational steps through multiple graphical user interfaces. Further, the approaches implemented by some systems—such as the detailed logging of each step at every checkpoint—degrades the performance of these systems and slows down the processing, consuming a significant amount of computing resources during operation.

The profile journey visualization system operates with improved flexibility when compared to conventional systems. For instance, the profile journey visualization system offers a flexible approach to gathering and presenting information related to a user profile with respect to a workflow journey. Indeed, by determining and storing workflow journey data related to the user profile with respect to a workflow journey and extracting that data for presentation in response to receiving an identifier, the profile journey visualization system provides improved flexibility. In particular, the profile journey visualization system flexibly circumvents the need to navigate through various graphical user interface components, enter rigid executable language, or meticulously engage with the backend to determine the desired information.

Further, the profile journey visualization system operates with improved efficiency when compared to conventional systems. For example, the profile journey visualization system implements a graphical user interface that reduces the user interactions required to obtain the state of a user profile with respect to a workflow journey. Indeed, the profile journey visualization system implements a consolidated graphical user interface that receives an identifier and provides a visual representation of the state of the associated user profile. Thus, the profile journey visualization system reduces the user interactions typically required under conventional systems retrieve relevant information. Further, the profile journey visualization system reduces the amount of computing resources consumed when compared to conventional systems that utilize detailed logging of each step at every checkpoint.

As illustrated by the foregoing discussion, the present disclosure utilizes a variety of terms to describe features and benefits of the profile journey visualization system. Additional detail is now provided regarding the meaning of these terms. For example, as used herein, the term "user profile" refers to a digital representation of a user. In particular, in some embodiments, a user profile refers to a particular digital representation of a user with respect to one or more particular entities (e.g., digital platforms). For instance, in some cases, a user profile includes a collection of data that is associated with the corresponding user. To illustrate, in some implementations, a user profile includes preferences of the user, identifying information for the user, and/or behavioral data of the user (e.g., previous actions taken by the user when interacting with the one or more entities).

Additionally, as used herein, the term "identifier of a user profile" (or "identifier") refers to a unique identifier that is associated with a user profile with respect to an entity. For instance, in some cases, an identifier refers to a string of characters that uniquely identify the corresponding user profile in the context of an entity. To illustrate, in some embodiments, an identifier includes, but is not limited to, an email address, a phone number, a name or identifying tag, or a physical address associated with a user profile. In some cases, however, an identifier includes a graphic, such as a digital photo or other image.

As used herein, the term "workflow journey" refers to an organized set of occurrences initiated and/or experienced by a user profile during interactions with an entity. In particular, in some embodiments, a workflow journey refers to a defined set of occurrences that could be initiated and/or experienced by one or more user profiles when interacting with the entity. For instance, in some cases, the entity defines or creates a workflow journey and one or more user profiles engaging with the entity potentially progress with the workflow journey. For example, in some cases, a user profile progresses through the workflow journey upon satisfaction of one or more conditions. Indeed, in some implementations, a workflow journey includes a set of conditions to be met, events, and/or actions encountered, performed, and/or experienced by a user profile during a user experience with the products or services of a company, an organization, or another entity. In some cases, a workflow journey includes an ordered set (e.g., a sequence) of occurrences. In some embodiments, a workflow journey includes multiple paths, with each path potentially including its own ordered set of occurrences. For instance, in some implementations, a workflow journey includes multiple paths that branch off of at least one other path of the workflow journey.

Additionally, as used herein, the term "event" refers to a defined activity that is part of a workflow journey. In particular, in some embodiments, an event refers to a defined activity that can be initiated or performed by a user profile with respect to an entity as part of a workflow journey. In other words, in some implementations, an event corresponds to an activity that could be initiated or performed by a user profile with respect to an entity to begin, advance within, or complete a workflow journey. Indeed, in some cases, the starting, advancement, or completion of a workflow journey by a user profile depends upon the occurrence of a defined event (where the defined event is at least one option at a given point in time). As an illustration, in some cases, an event corresponds to a defined behavior or a defined category of behavior that a user profile could exhibit, such as creating a user account, registering a product, or performing some designated activity whether online or offline.

Further, as used herein, the term "action" refers to a defined response that is part of a workflow journey. In particular, in some embodiments, an action refers to a defined response to one or more events that have occurred as part of a workflow journey. Indeed, in some cases, an action refers to a response of an entity that is triggered by the occurrence of one or more events of a workflow journey. To illustrate, in some cases, an action includes a communication or digital content sent to a user profile or a provision of access to one or more features or services in response to the user profile initiating or performing one or more events of a workflow journey.

As used herein, the term "state of a user profile" (or "state") refers to a status of a user profile with respect to a workflow journey. In particular, in some embodiments, a state of a user profile refers to the current position of the user profile within the workflow journey and/or a path of the workflow journey taken by the user profile. In some cases, a state of a user profile further includes additional data, such as the details of an occurrence (e.g., a designation of the occurrence, the timing of the occurrence, and/or a failure or successfulness of the occurrence).

Additionally, as used herein, the term "visual representation of a workflow journey" (or "visual representation") refers to one or more graphical elements that represent at least a portion of a workflow journey. In particular, in some embodiments, a visual representation of a workflow journey includes a set of nodes and edges connecting the nodes to visually represent the workflow journey. For instance, in some cases, a visual representation of a workflow journey includes one or more event nodes, one or more action nodes, and/or one or more other nodes (e.g., termination nodes, error nodes, or orchestration nodes) that are part of the workflow journey. In some implementations, a visual representation of a workflow journey arranges the nodes and edges to represent a flow, sequence, or available paths associated with the workflow journey.

Further, as used herein, the term "workflow journey data" refers to digital data related to a workflow journey and/or the participation of a user profile within the workflow journey. In particular, in some embodiments, workflow journey data refers to digital data related to the engagement of a user profile with an entity with respect to a workflow journey. For instance, in some cases, workflow journey data includes digital data corresponding to the state of a user profile with respect to a workflow journey and/or occurrences of the workflow journey with respect to the user profile (e.g., events, actions, and/or errors that have occurred).

Additional detail regarding the profile journey visualization system will now be provided with reference to the figures. For example, FIG. 1 illustrates a schematic diagram of an exemplary system environment ("environment") 100 in which a profile journey visualization system 106 operates. As illustrated in FIG. 1, the environment 100 includes a server(s) 102, a network 108, client devices 110*a*-110*n*, an administrator device 114, and a workflow journey database 118.

Although the environment 100 of FIG. 1 is depicted as having a particular number of components, the environment 100 is capable of having any number of additional or alternative components (e.g., any number of servers, client devices, administrator devices, workflow journey databases, or other components in communication with the profile journey visualization system 106 via the network 108). Similarly, although FIG. 1 illustrates a particular arrangement of the server(s) 102, the network 108, the client devices 110a-110n, the administrator device 114, and the workflow journey database 118, various additional arrangements are possible.

The server(s) 102, the network 108, the client devices 110a-110n, the administrator device 114, and the workflow journey database 118 are communicatively coupled with each other either directly or indirectly (e.g., through the network 108 discussed in greater detail below in relation to FIG. 9). Moreover, the server(s) 102, the client devices 110a-110n, and the administrator device 114 include one of a variety of computing devices (including one or more computing devices as discussed in greater detail with relation to FIG. 9).

As mentioned above, the environment 100 includes the server(s) 102. In one or more embodiments, the server(s) 102 generates, stores, receives, and/or transmits digital data including workflow journey data. In one or more embodiments, the server(s) 102 comprises a data server. In some implementations, the server(s) 102 comprises a communication server or a web-hosting server.

As shown in FIG. 1, the server(s) 102 includes a content distribution system 104. In one or more embodiments, the content distribution system 104 manages the distribution of digital content to client devices (e.g., the client devices 110a-110n). For example, in some instances, the content distribution system 104 distributes digital content to a client device in response to detecting the occurrence of an event by a user profile associated with the client device. Indeed, in some cases, the content distribution system 104 monitors the activity of the user profile associated with a client device and performs an action by providing digital content to the client device in response to detecting the occurrence of an event due to the activity of the user profile.

Additionally, the server(s) 102 include the profile journey visualization system 106. In one or more embodiments, via the server(s) 102, the profile journey visualization system 106 generates and/or provides a visual representation of a workflow journey for display within a graphical user interface of a client device (e.g., one of the client devices 110a-110n). Via the server(s) 102, the profile journey visualization system 106 further receives an identifier associated with a user profile through the graphical user interface. The profile journey visualization system 106, via the server(s) 102, modifies the visual representation displayed within the graphical user interface to reflect a state of the user profile with respect to the workflow journey. Example components of the profile journey visualization system 106 will be described below with reference to FIG. 7.

In one or more embodiments, the client devices 110a-110n include computing devices that can engage in activity with respect to an entity (e.g., the content distribution system 104) and receive responses to that activity, including by receiving digital content. For example, the client devices 110a-110n include one or more of smartphones, tablets, desktop computers, laptop computers, head-mounted-display devices, and/or other electronic devices. In some instances, the client devices 110a-110n include one or more applications (e.g., the client applications 112a-112n, respectively) that can engage in activity and receive responses to that activity, including by receiving digital content. For example, in one or more embodiments, the client applications 112a-112n include a software application installed on the client devices 110a-110n, respectively. Additionally, or alternatively, the client applications 112a-112n include a web browser or other application that accesses a software application hosted on the server(s) 102 (and supported by the content distribution system 104).

In one or more embodiments, the administrator device 114 includes a computing device that can display visual representations of workflow journeys and the states of user profiles with respect to those profile journeys as well as interact with such visual representations. In particular, in some cases the administrator device 114 includes a client device utilized by an administrative entity. For example, the administrator device 114 includes one or more of smartphones, tablets, desktop computers, laptop computers, head-mounted-display devices, and/or other electronic devices. In some instances, the administrator device 114 includes one or more applications (e.g., the administrator application 116) that can display visual representations of workflow journeys and the states of user profiles with respect to those profile journeys as well as interact with such visual representations. For example, in one or more embodiments, the administrator application 116 includes a software application installed on the administrator device 114. Additionally, or alternatively, the administrator application 116 includes a web browser or other application that accesses a software application hosted on the server(s) 102 (and supported by the content distribution system 104).

In one or more embodiments, the workflow journey database 118 stores workflow journey data for user profiles. For example, in some instances, the workflow journey database 118 stores workflow journey data for a plurality of user profiles with respect to one or more journey workflows. The workflow journey database 118 further provides access to the workflow journey data to the profile journey visualization system 106. Though FIG. 1, illustrates the workflow journey database 118 as a distinct component, one or more embodiments include the workflow journey database 118 as a component of the server(s) 102, the content distribution system 104, or the profile journey visualization system 106.

In other words, in some implementations, the profile journey visualization system 106 collects workflow journey data based on interactions of user profiles (e.g., via the client devices 110a-110n) with an entity (e.g., the content distribution system 104). The profile journey visualization system 106 stores the workflow journey data within the workflow journey database 118. Further, the profile journey visualization system 106 utilizes the stored workflow journey database to modify a visual representation of a workflow journey displayed on the administrator device 114 to reflect the state of a queried user profile with respect to the workflow journey.

The profile journey visualization system 106 can be implemented in whole, or in part, by the individual elements of the environment 100. Indeed, as shown in FIG. 1, the profile journey visualization system 106 can be implemented with regard to the server(s) 102, at the client devices 110a-110n, and/or at the administrator device 114. In particular embodiments, the profile journey visualization system 106 on the client devices 110a-110n and/or the administrator device 114 comprises a web application, a native application installed on the client devices 110a-110n and/or the administrator device 114 (e.g., a mobile application, a desktop application, a plug-in application, etc.), or a cloud-based application where part of the functionality is performed by the server(s) 102.

In additional or alternative embodiments, the profile journey visualization system 106 on the client devices 110a-

110*n* and/or the administrator device 114 represents and/or provides the same or similar functionality as described herein in connection with the profile journey visualization system 106 on the server(s) 102. In some implementations, the profile journey visualization system 106 on the server(s) 102 supports the profile journey visualization system 106 on the client devices 110*a*-110*n* and/or the administrator device 114.

In some embodiments, the profile journey visualization system 106 includes a web hosting application that allows the client devices 110*a*-110*n* and/or the administrator device 114 to interact with content and services hosted on the server(s) 102. To illustrate, in one or more implementations, the administrator device 114 access a web page or computing application supported by the server(s) 102. The administrator device 114 provides input to the server(s) 102, such as an identifier associated with a user profile. In response, the profile journey visualization system 106 on the server(s) 102 modifies a visual representation of a workflow journey displayed on the administrator device 114 to reflect a state of the user profile with respect to the workflow journey.

In some embodiments, though not illustrated in FIG. 1, the environment 100 has a different arrangement of components and/or has a different number or set of components altogether. For example, in certain embodiments, the client devices 110*a*-110*n* and/or the administrator device 114 communicate directly with the server(s) 102, bypassing the network 108. As another example, the environment 100 includes a third-party server comprising a content server and/or a data collection server.

Figure 2:
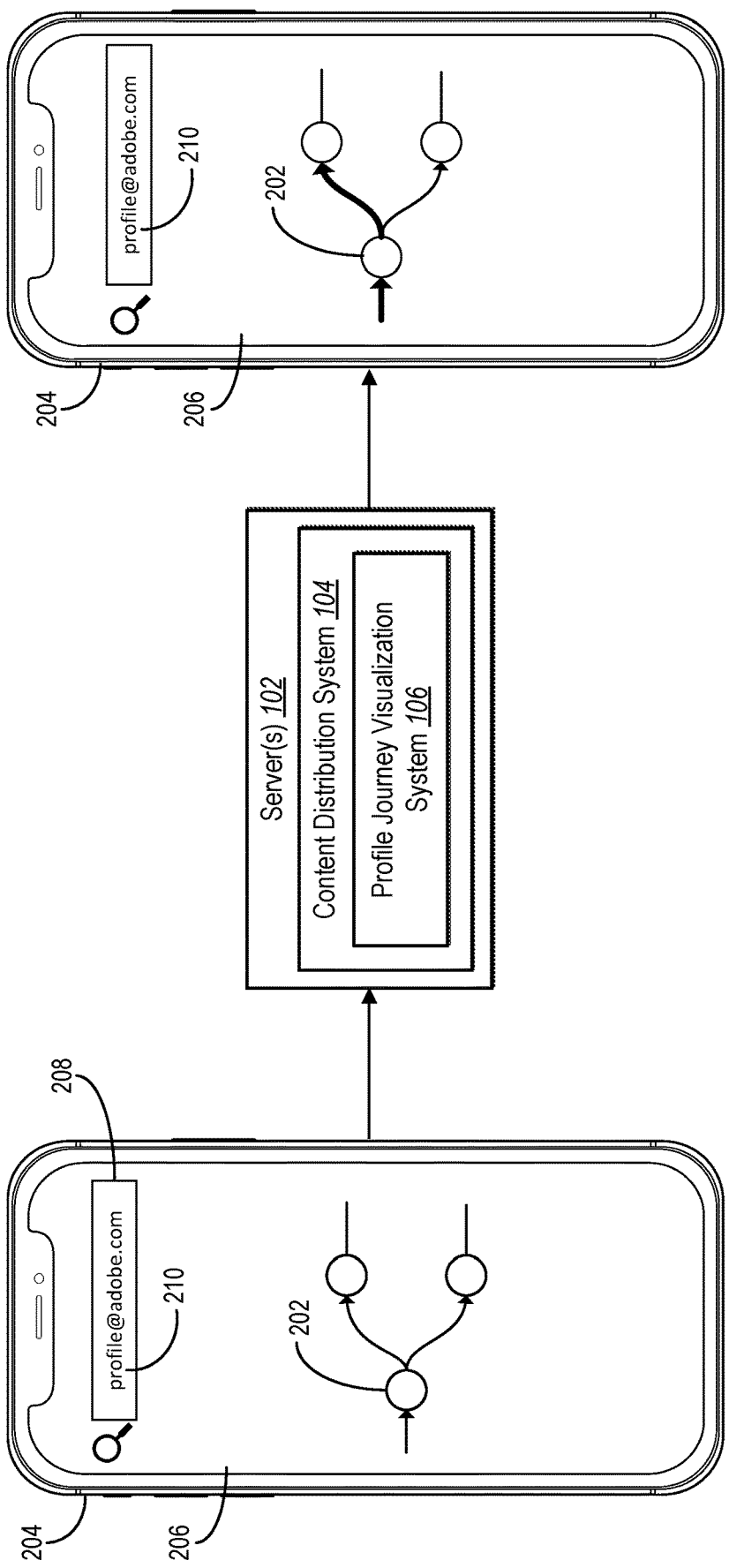
FIG. 2 illustrates an overview diagram of the profile journey visualization system providing a visual representation of a workflow journey that reflects a state of a user profile with respect to that workflow journey in accordance with one or more embodiments.

As mentioned above, the profile journey visualization system 106 generates and provides a visual representation of a workflow journey that reflects a state of a user profile with respect to that workflow journey. FIG. 2 illustrates an overview diagram of the profile journey visualization system 106 providing a visual representation of a workflow journey that reflects a state of a user profile with respect to that workflow journey in accordance with one or more embodiments.

As shown in FIG. 2, the profile journey visualization system 106 provides a visual representation 202 of a workflow journey for display on an administrator device 204. In particular, the profile journey visualization system 106 provides a graphical user interface 206 for display on the administrator device 204 and further provides the visual representation 202 for display within the graphical user interface 206. In one or more embodiments, the profile journey visualization system 106 provides the visual representation 202 for display in response to a selection of the workflow journey via the administrator device 204. To illustrate, in some cases, the profile journey visualization system 106 provides, within the graphical user interface 206, options for selecting from among a plurality of previously defined workflow journeys. Upon detecting a selection of a workflow journey, the profile journey visualization system 106 generates and provides the corresponding visual representation for display, or provides a previously generated visual representation for display, within the graphical user interface 206.

As further shown in FIG. 2, the profile journey visualization system 106 provides an interactive search option 208 for display within the graphical user interface 206. In particular, the profile journey visualization system 106 provides the interactive search option 208 for searching for data (e.g., workflow journey data) associated with one or more user profiles. Indeed, as shown in FIG. 2, the interactive search option 208 includes a text box. The interactive search option, however, can include various elements in various embodiments, such as a drop-down menu or a set of checkboxes or radio buttons for checking workflow journeys for which workflow journey data is desired.

Indeed, as illustrated, the profile journey visualization system 106 receives an identifier 210 associated with a user profile from the administrator device 204 via the graphical user interface 206. In particular, the profile journey visualization system 106 receives the identifier 210 via one or more interactions with the interactive search option 208 (e.g., a user typing the identifier 210 into the interactive search option 208).

As shown in FIG. 2, in response to receiving the identifier 210, the profile journey visualization system 106 modifies the visual representation 202 within the graphical user interface 206. In particular, the profile journey visualization system 106 modifies the profile journey visualization system 106 to reflect the state of the user profile associated with the identifier 210. To illustrate, in one or more embodiments, the profile journey visualization system 106 utilizes the identifier 210 to retrieve a set of workflow journey data that is associated with the corresponding user profile. The profile journey visualization system 106 determines a state of the user profile using the workflow journey data. Accordingly, the profile journey visualization system 106 modifies the visual representation 202 within the graphical user interface 206 to reflect the determined state.

Figure 3:
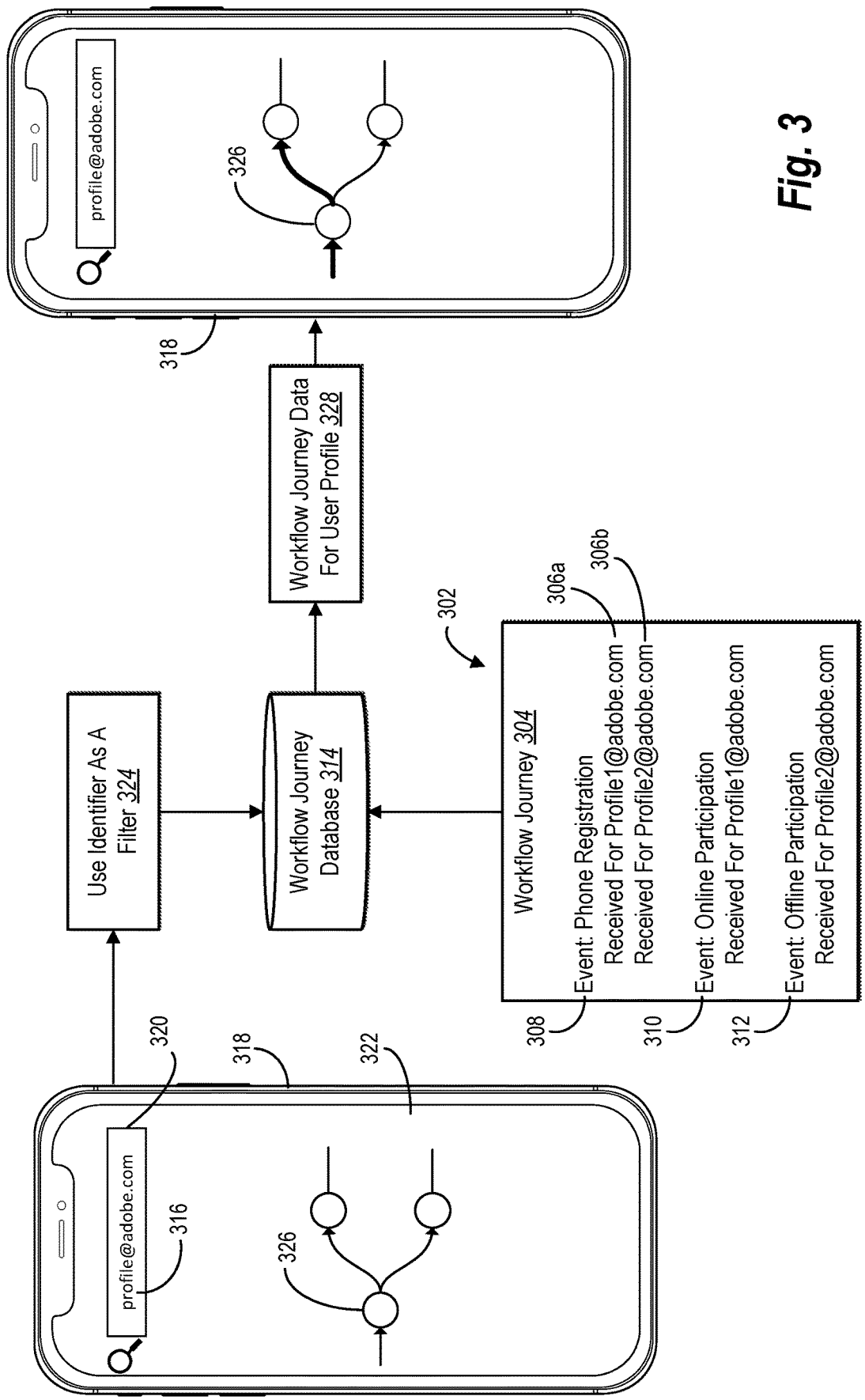
FIG. 3 illustrates a diagram for using an identifier to modify a visual representation of a workflow journey to represent a state of a user profile in accordance with one or more embodiments.

As previously discussed, in one or more embodiments, the profile journey visualization system 106 utilizes a received identifier associated with a user profile to modify a visual representation of a workflow journey to reflect the state of the user profile with respect to a workflow journey. FIG. 3 illustrates a diagram for using an identifier to modify a visual representation of a workflow journey to represent a state of a user profile in accordance with one or more embodiments.

As shown in FIG. 3, the profile journey visualization system 106 determines workflow journey data 302 for a plurality of user profiles (e.g., user profiles associated with the identifiers 306*a*-306*b*). In particular, FIG. 3 illustrates that the profile journey visualization system 106 determines the workflow journey data 302 with respect to a workflow journey 304. Though FIG. 3 illustrates determining workflow journey data with respect to a particular workflow journey, the profile journey visualization system 106 similarly determines workflow journey data for the plurality of user profiles with respect to a plurality of workflow journeys in various embodiments.

In one or more embodiments, the profile journey visualization system 106 determines the workflow journey data 302 by monitoring the activity of the user profiles (e.g., when the user profiles are engaging with a particular entity). For instance, as indicated by FIG. 3, the profile journey visualization system 106 monitors the activity of the user profiles to detect events associated with the workflow journey 304 (e.g., a registration event 308, an online participation event 310, or an offline participation event 312) that have been initiated or performed by the user profiles. In some cases, the profile journey visualization system 106 also tracks additional data associated with the detected events, such as the timing of the events, a device used for each event, or a status of the user profile within respect to the event (e.g., a status indicating whether the event has been completed or is pending).

In some cases, the profile journey visualization system 106 further monitors actions taken in response to the activity of the user profile. For instance, in some embodiments, the profile journey visualization system 106 monitors communications transmitted to client devices associated with the user profiles (e.g., communications that include digital content) in response to events caused by the user profiles. In some instances, the profile journey visualization system 106 also tracks additional data associated with the actions, such as the timing of the actions or the status of the actions (e.g., a status indicating whether response has been completed or is pending).

In some implementations, the profile journey visualization system 106 also determines other workflow journey data for the user profiles with respect to the workflow journey 304. For instance, in some cases, the profile journey visualization system 106 determines whether an error has occurred for a user profile (e.g., that a communication sent to a client device associated with a user profile failed). In some instances, the profile journey visualization system 106 determines whether the workflow journey has terminated for the user profile (e.g., whether the user profile has completed the workflow journey or otherwise exited the workflow journey).

Accordingly, in one or more embodiments, the profile journey visualization system 106 tracks the progress of the user profiles with respect to the workflow journey 304 and/or various other details associated with the user profiles with respect to the workflow journey 304. Using the tracked information, the profile journey visualization system 106 can determine a state for each of the user profiles with respect to the workflow journey 304.

As further shown in FIG. 3, the profile journey visualization system 106 associates the identifiers of the user profiles (e.g., the identifiers 306a-306b) with the respective workflow journey data. In particular, the profile journey visualization system 106 associates the identifier for a given user profile with each segment of workflow journey data that corresponds to that user profile. For instance, FIG. 3 illustrates the profile journey visualization system 106 associating the identifiers 306a-306 with each event performed by their respective user profile. Similarly, the profile journey visualization system 106 associates the identifier for a given user profile with actions performed in response to activity of the user profile, errors encountered, or other relevant workflow journey data.

FIG. 3 illustrates a particular configuration of the workflow journey data 302. Indeed, FIG. 3 indicates that the profile journey visualization system 106 tracks which user profiles are associated with the occurrences (e.g., events, actions, and/or errors) of the workflow journey 304. Other configurations for the workflow journey data 302 can be used in other embodiments. For instance, in some implementations, the profile journey visualization system 106 maintains a log for each user profile and utilizes the log to track the workflow journeys in which the user profile is engaged and/or the experience of the user profile with respect to each workflow journey (e.g., the events performed, the responses received, or the errors encountered).

As further shown in FIG. 3, the profile journey visualization system 106 stores the workflow journey data 302. Indeed, the profile journey visualization system 106 stores and maintains, within the workflow journey database 314 the workflow journey data 302 determined for the plurality of user profiles with respect to the workflow journey 304. In some cases, the profile journey visualization system 106 further stores the association between the identifiers for the user profiles and their respective sets of workflow journey data.

Additionally, as shown in FIG. 3, the profile journey visualization system 106 receives an identifier 316 for a user profile from an administrator device 318. In particular, the profile journey visualization system 106 provides an interactive search option 320 for display within a graphical user interface 322 of the administrator device 318 and receives the identifier 316 via one or more user interactions with the interactive search option 320. In some implementations, the profile journey visualization system 106 receives the identifier 316 as part of a query to search for workflow journey data for the corresponding user profile with respect to a particular workflow journey, such as the workflow journey that corresponds to the visual representation 326 displayed within the graphical user interface 322 (e.g., the workflow journey 304).

As shown in FIG. 3, the profile journey visualization system 106 further performs an act 324 of using the identifier as a filter. In particular, in response to receiving the identifier 316, the profile journey visualization system 106 determines a set of workflow journey data 328 that is associated with the corresponding user profile by filtering the workflow journey data stored in the workflow journey database 314 using the identifier 316. For example, in one or more embodiments, the profile journey visualization system 106 identifies and retrieves segments of workflow journey data that are associated with the identifier 316. As previously mentioned, in some cases, the profile journey visualization system 106 receives the identifier 316 as part of a query for a particular workflow journey (e.g., the workflow journey 304). Accordingly, the profile journey visualization system 106 identifies and retrieves segments of workflow journey data that are associated with the identifier 316 and the workflow journey.

As further shown in FIG. 3, the profile journey visualization system 106 utilizes the set of workflow journey data 328 retrieved using the identifier 316 to modify the visual representation 326 of the workflow journey that is displayed on the administrator device 318. Indeed, in some cases, the profile journey visualization system 106 modifies the visual representation 326 to reflect a state of the user profile associated with the identifier 316 with respect to the workflow journey. Thus, the profile journey visualization system 106 tracks the experience of a user profile with respect to a workflow journey and modifies a visual representation of the workflow journey to reflect that experience.

Figure 4:
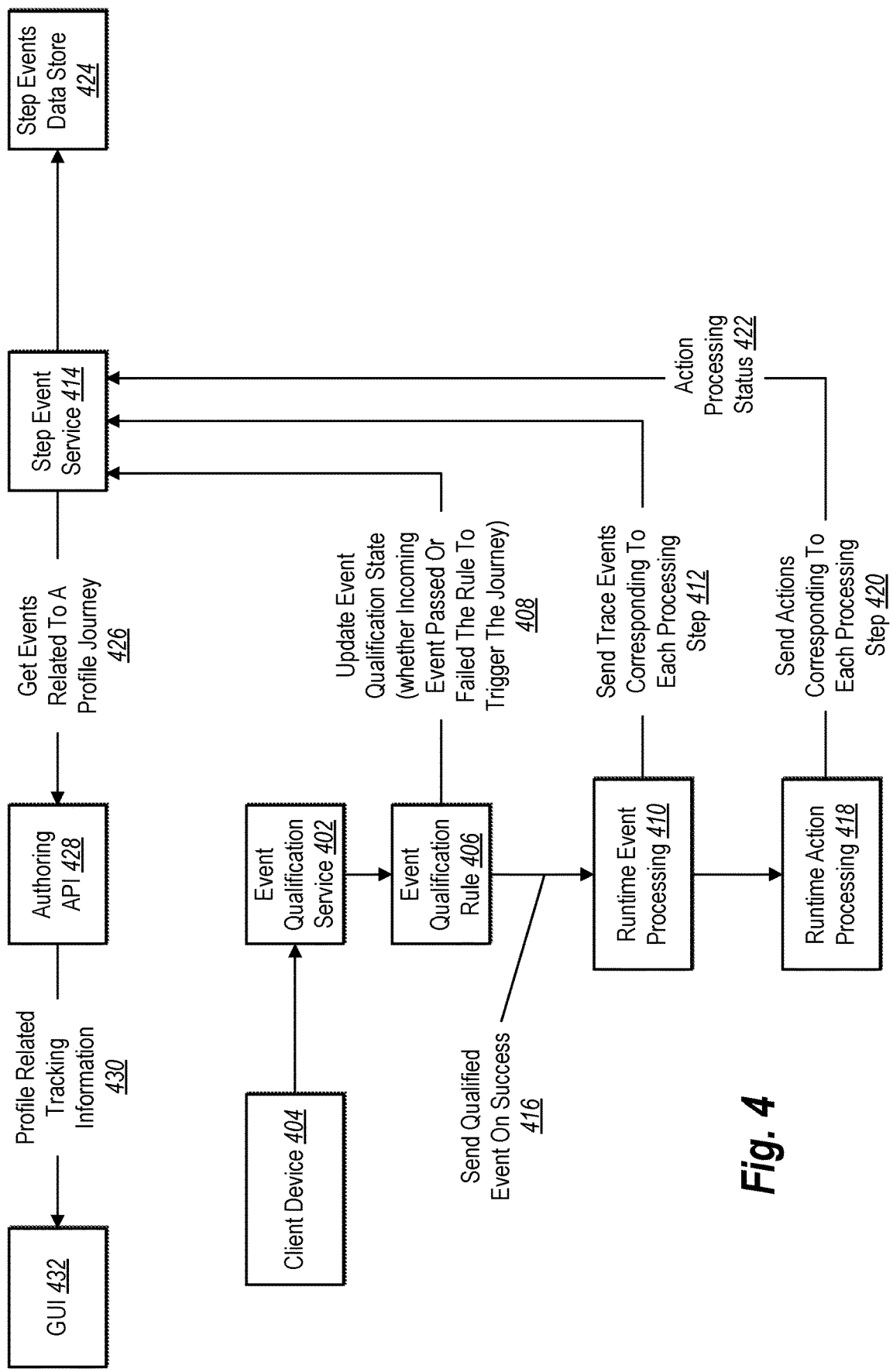
FIG. 4 illustrates a diagram of a backend of flow used by the profile journey visualization system to collect workflow journey data for a user profile and use the workflow journey data to provide a representation of the state of the user profile in accordance with one or more embodiments.

FIG. 4 illustrates a diagram of a backend of flow used by the profile journey visualization system 106 to collect workflow journey data for a user profile and use the workflow journey data to provide a representation of the state of the user profile in accordance with one or more embodiments. In particular, FIG. 4 shows example components used by the profile journey visualization system 106 and the flow of operation used in at least one embodiment.

Indeed, as shown in FIG. 4, the profile journey visualization system 106 utilizes an event qualification service 402 to detect when a user profile initiates or performs an event via some activity. In particular, in some embodiments, the profile journey visualization system 106 monitors activity of the user profile via a client device 404 and determines when the activity corresponds to an event (e.g., the activity includes the user profile submitting information via a registration rather than browsing activity or log on activity, though such activity could qualify as an event in some implementations).

Additionally, as shown in FIG. 4, the profile journey visualization system 106 utilizes an event qualification rule 406 to determine whether the detected event qualifies as an event of a particular workflow journey. In particular, in one or more embodiments, the profile journey visualization system 106 utilizes the event qualification rule 406 to determine whether the detected event corresponds to an initial event of a workflow journey. Accordingly, the profile journey visualization system 106 determines whether the detected event qualifies the user profile to enter into the workflow journey. Indeed, in one or more embodiments, the profile journey visualization system 106 determines that a workflow journey includes an event that must be performed by a user profile to trigger the user experience associated with the workflow journey. Thus, the profile journey visualization system 106 enters a user profile into the workflow journey upon detection of that triggering event.

Indeed, as shown in FIG. 4, the profile journey visualization system 106 performs an act 408 of updating the event qualification status of the user profile based on application of the event qualification rule 406. In particular, the profile journey visualization system 106 updates the event qualification status with a step event service component 414. In some cases, the profile journey visualization system 106 utilizes the step event service component 414 to maintain a record of the user profile's activity and/or state with respect to the workflow journey. As shown, the profile journey visualization system 106 further performs an act 416 of sending the qualified event (e.g., an indication of the qualified event) to a runtime event processing component 410. For instance, in some cases, the profile journey visualization system 106 sends the (indication of the) qualified event to indicate that the user profile has entered the workflow journey and other events from the workflow journey are to be looked for.

Indeed, as further shown in FIG. 4, the profile journey visualization system 106 utilizes the runtime event processing component 410 to detect one or more additional events initiated or performed by the user profile. For instance, in some cases, after determining that the user profile has been entered into a workflow journey, the profile journey visualization system 106 determines whether further activity of the user profile corresponds to one or more other events from the workflow journey. In particular, the profile journey visualization system 106 determines whether the further activity corresponds to a next event which can be performed to advance the user profile within the workflow journey. Accordingly, as shown in FIG. 4, the profile journey visualization system 106 performs an act 412 of sending updates regarding the events performed by the user profile to the step event service component 414.

As shown in FIG. 4, the profile journey visualization system 106 also utilizes a runtime action processing component 418 to detect or perform actions in response to the events performed by the user profile. As illustrated, the profile journey visualization system 106 performs an act 420 of sending updates regarding the actions performed in response to detected events to the step event service component 414. As further illustrated, the profile journey visualization system 106 sends updates regarding the action processing status 422 for each action to the step event service component 414. In one or more embodiments, the action processing status 422 for an action includes a status of initiation and/or completion of the action. In some cases, the action processing status 422 for an action further includes one or more errors encountered when performing the action (e.g., a message transmission failure).

As shown in FIG. 4, the profile journey visualization system 106 stores the data received by the step event service component 414—the workflow journey data regarding the events and actions—within a step events data store 424 (e.g., a workflow journey database). Further, the profile journey visualization system 106 performs an act 426 of retrieving a set of workflow journey data that is relevant to a user profile with respect to a workflow journey. For instance, in some implementations, the profile journey visualization system 106 stores workflow journey data associated with a plurality of user profiles with respect to a plurality of workflow journeys within the step events data store 424. Accordingly, the profile journey visualization system 106 retrieves a particular set of workflow journey data associated with a particular user profile with respect to a particular workflow journey. In some cases, the profile journey visualization system 106 utilizes an identifier received with respect to a workflow journey to retrieve the corresponding set of workflow journey data.

As further shown, the profile journey visualization system 106 provides the retrieved set of workflow journey data to an authoring application programming interface (API) component 428. In one or more embodiments, the profile journey visualization system 106 utilizes the authoring application programming interface component 428 to generate profile related tracking information 430. For instance, in some cases, the profile journey visualization system 106 utilizes the authoring application programming interface component 428 to generate or modify a visual representation of workflow journey to reflect a state of the user profile with respect to the workflow journey. As shown in FIG. 4, the profile journey visualization system 106 provides the profile related tracking information 430 to a graphical user interface 432 displayed on an administrator device (labeled here as "Journey Canvas"). Thus, the profile journey visualization system 106 presents profile related tracking information with respect to a workflow journey for display.

As previously discussed, the profile journey visualization system 106 utilizes a consolidated graphical user interface to present workflow journey data for a user profile with respect to a workflow journey. In particular, in some embodiments, the profile journey visualization system 106 utilizes a consolidated graphical user interface to receive an identifier for a user profile and provide a visual representation of a state of the user profile with respect to a workflow journey. FIGS. 5A-5E illustrate a graphical user interface utilized by the profile journey visualization system 106 to receive identifiers and provide visual representations of corresponding user profile states in accordance with one or more embodiments.

Figure 5A:
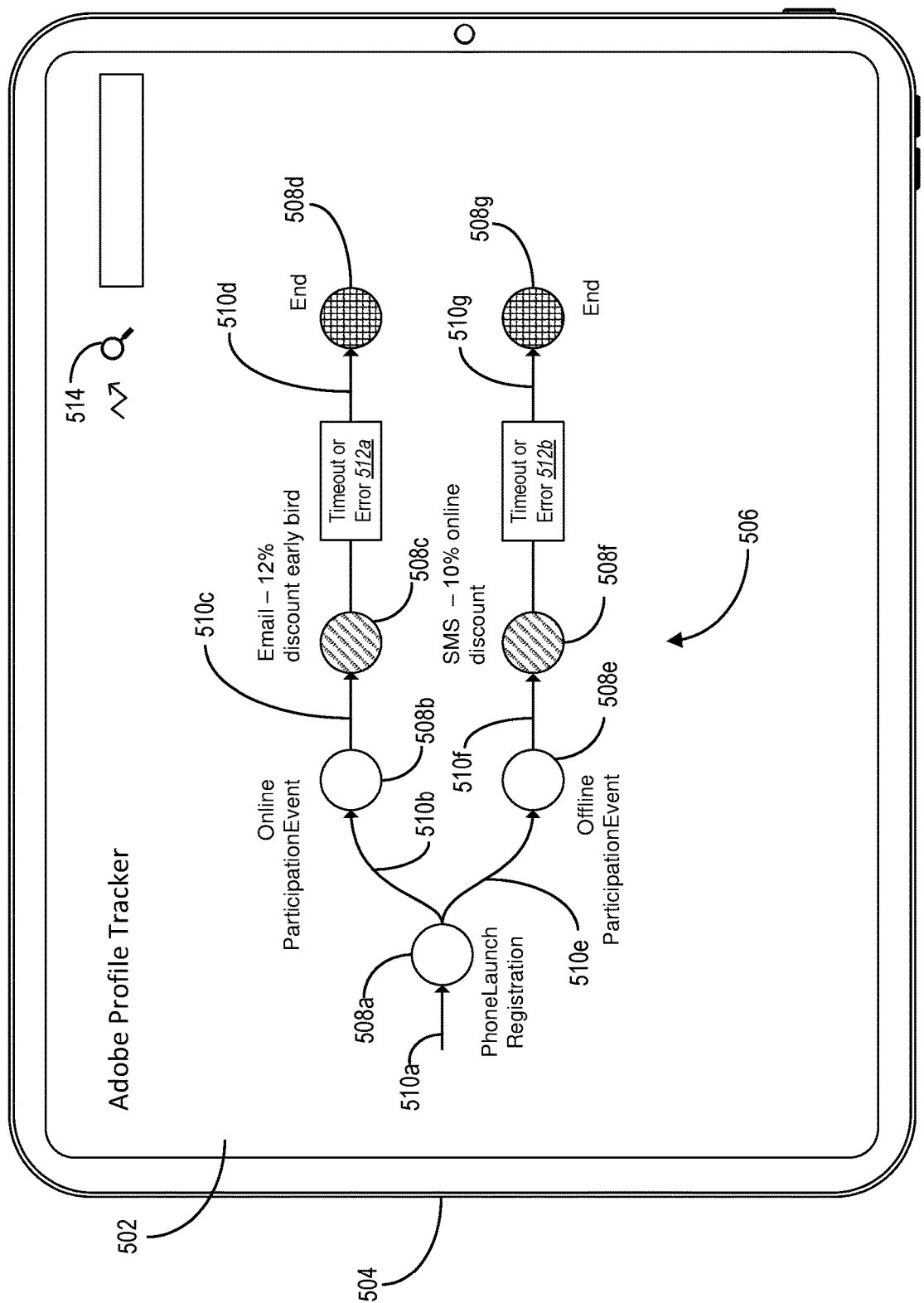
FIGS. 5A-5E illustrate a graphical user interface utilized by the profile journey visualization system to receive identifiers and provide visual representations of corresponding user profile states in accordance with one or more embodiments.

Indeed, as shown in FIG. 5A, the profile journey visualization system 106 generates and provides a graphical user interface 502 for display on an administrator device 504. Further, the profile journey visualization system 106 provides, for display within the graphical user interface 502, a visual representation 506 of a workflow journey. As shown, the visual representation 506 includes a plurality of nodes 508a-508g. In particular, the node 508a, the node 508b, and the node 508e each correspond to an event that is associated with the workflow journey. The node 508c and the node 508f each correspond to an action of the workflow journey. Further, the node 508d and the node 508g are termination nodes indicating the end of the workflow journey.

As further shown, the visual representation 506 includes a plurality of edges 510a-510g that provide connections between the plurality of nodes 508a-508g. In one or more embodiments, the edge 510a is an initialization edge that represents entrance of a user profile into the workflow journey upon completion of the event represented by the node 508a.

As illustrated, in FIG. 5A, the visual representation 506 includes multiple paths of nodes and edges corresponding to multiple paths of the workflow journey. In particular, the visual representation 506 includes paths that branch off of a common path (e.g., the path containing the node 508a). In one or more embodiments, the profile journey visualization system 106 determines the path taken by a user profile based on the events performed by the user profile. For instance, upon determining that a user profile performs an event represented by the node 508b (e.g., after performing the initial event represented by the node 508a), the profile journey visualization system 106 determines that the user profile is taking the upper path of the visual representation 506. Likewise, upon determining that a user profile performs an event represented by the node 508e, the profile journey visualization system 106 determines that the user profile is taking the lower path of the visual representation 506. Though the visual representation 506 includes multiple paths that branch from a common path, a workflow journey can include paths that do not branch from a common path in some implementations (e.g., paths that run parallel to one another). In some cases, the profile journey visualization system 106 treats the branching paths as separate visual representations. In some instances, however, the profile journey visualization system 106 treats the two paths as components of a single visual representation.

As further shown in FIG. 5A, the visual representation 506 includes additional nodes 512a-512b corresponding to errors that may be experienced during the workflow journey. In particular, the additional node 512a corresponds to an error that may be experienced while in the upper branch, and the additional node 512b corresponds to an error that may be experienced while in the lower branch of the workflow journey.

As shown in FIG. 5A, the profile journey visualization system 106 further provides an interactive search option 514 for searching for workflow journey data for a user profile with respect to the workflow journey that corresponds to the visual representation 506. In some embodiments, the interactive search option 514 includes an initial interactive search option through which a user can indicate that they desire to perform a search. Accordingly, in some cases, the profile journey visualization system 106 provides another interactive search option for display through which user input can be received in response to detecting a selection of the interactive search option 514.

Figure 5B:
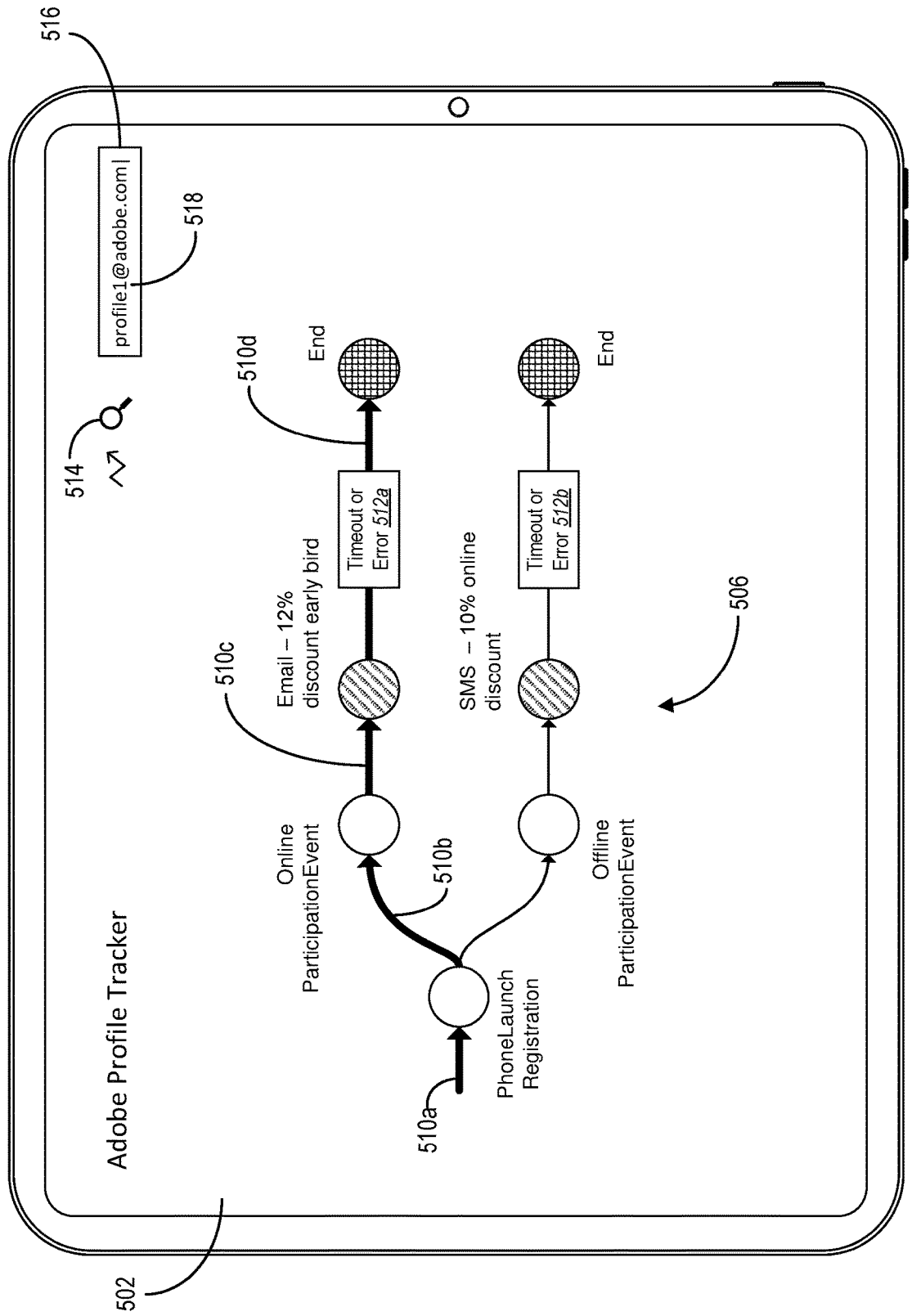

Indeed, as shown in FIG. 5B, upon selection of the interactive search option 514, the profile journey visualization system 106 further provides an additional interactive search option 516 for display within the graphical user interface 502 in some embodiments. In particular, the profile journey visualization system 106 provides a text box through which user input can be provided. As illustrated, the profile journey visualization system 106 receives an identifier 518 via the additional interactive search option 516.

As further illustrated, in response to receiving the identifier 518, the profile journey visualization system 106 modifies the visual representation 506 to reflect a state of the user profile that corresponds to the identifier 518 with respect to the represented workflow journey. For instance, as previously discussed, the profile journey visualization system 106 utilizes the identifier 518 to determine a set of workflow journey data that corresponds to the user profile in some cases. In particular, in some embodiments, the profile journey visualization system 106 filters workflow journey data maintained at a storage location using the identifier 518 to determine the set of workflow journey data. Thus, the profile journey visualization system 106 modifies the visual representation 506 within the graphical user interface 502 using the determined set of workflow journey data.

As illustrated by FIG. 5B, the profile journey visualization system 106 modifies the visual representation 506 within the graphical user interface 502 by modifying one or more visual features of the edges 510a-510d. In particular, the profile journey visualization system 106 modifies a thickness of the edges 510a-510d. In some implementations, the profile journey visualization system 106 modifies one or more other visual features, such as the color.

By modifying the appearance of the edges 510a-510d, the profile journey visualization system 106 modifies the visual representation 506 to represent the state of the user profile associated with the identifier 518. In particular, by modifying the visual representation 506 as shown in FIG. 5B, the profile journey visualization system 106 indicates that the user profile has taken the upper path of the workflow journey. Further, by modifying every edge in the upper path, the profile journey visualization system 106 indicates that the user profile advanced to termination of this particular workflow journey via an encountered error. Thus, by modifying the visual representation 506, the profile journey visualization system 106 provides a visual representation of the state of the user profile, such as by highlighting a path taken by the user profile and/or indicating a current position of the user profile within the workflow journey.

Though FIG. 5B focuses on modifying one or more visual features of the edges of the visual representation 506, the profile journey visualization system 106 can modify other components of the visual representation 506 in various embodiments. For instance, in some cases, the profile journey visualization system 106 modifies one or more visual features of the nodes in the visual representation (e.g., color, shading, or outline thickness). In some instances, the profile journey visualization system 106 adds additional components to the visual representation 506 to reflect the state of the user profile with respect to the workflow journey (e.g., an additional arrow pointing to a node to represent the current state of the user profile or text providing a description of the current state of the user profile).

Figure 5C:
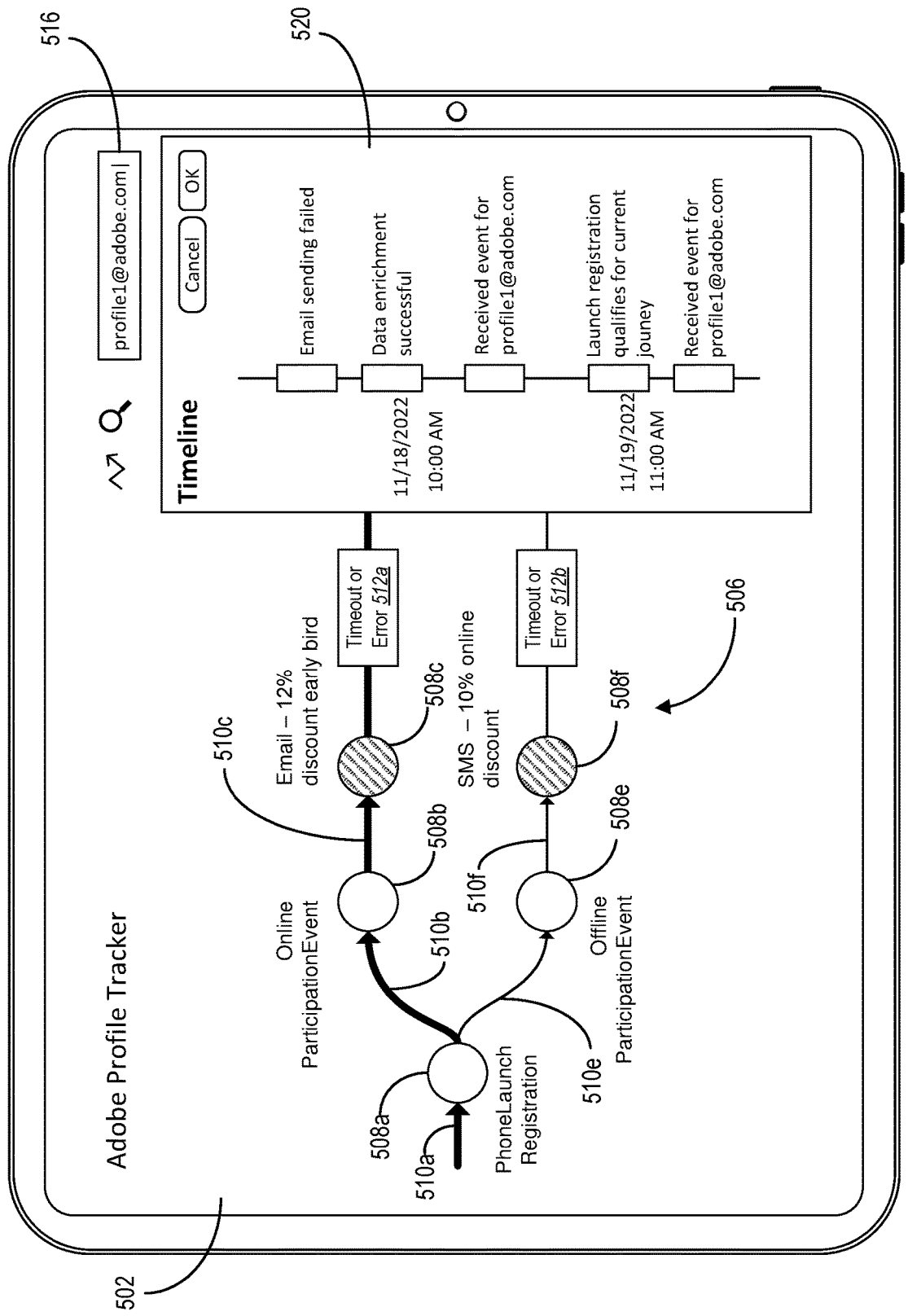

FIG. 5C illustrates the profile journey visualization system 106 providing additional detail for display within the graphical user interface 502 in accordance with one or more embodiments. In particular, as shown in FIG. 5C, the provides the additional detail within a side panel 520 displayed in the graphical user interface 502.

In one or more embodiments, the profile journey visualization system 106 provides the additional detail in response to detecting a user interaction with the visual representation 506. For instance, in some cases, the profile journey visualization system 106 detects a user interaction with one of the nodes 508a-508g (or other components) of the visual representation 506. In response to detecting the user interaction, the profile journey visualization system 106 provides the side panel 520 for display within the graphical user interface 502 and provides the additional detail for display within the side panel 520. For instance, as shown, the profile journey visualization system 106 overlays a portion of the graphical user interface 502 with the side panel 520.

As further shown in FIG. 5C, the additional detail provided by the profile journey visualization system 106 includes various details corresponding to a set of nodes from the visual representation 506. In other words, in some cases, upon selection of a single node (or other component), the profile journey visualization system 106 provides additional detail that corresponds to multiple nodes. In particular, as shown, the additional detail corresponds to the nodes from the overall path taken by the user profile (e.g., the details of the events, actions, and errors that correspond to those nodes). Thus, in one or more embodiments, the profile journey visualization system 106 utilizes the additional details to provide information regarding the experience of the user profile with respect to the workflow journey.

In one or more embodiments, the profile journey visualization system 106 dynamically updates the visual representation 506 within the graphical user interface 502 upon determining changes to the workflow journey data for the user profile. For instance, upon determining that events or actions have been performed, the profile journey visualization system 106 modifies the visual representation 506 to reflect those events or actions. Similarly, upon collecting or determining further detail with regard to the experience of the user profile, the profile journey visualization system 106 modifies the additional detail within the side panel 520 to reflect the newly determined further detail. Thus, in some cases, the profile journey visualization system 106 provides up-to-date information regarding the experience of a user profile without the need for a user to manually refresh the page.

Figure 5D:
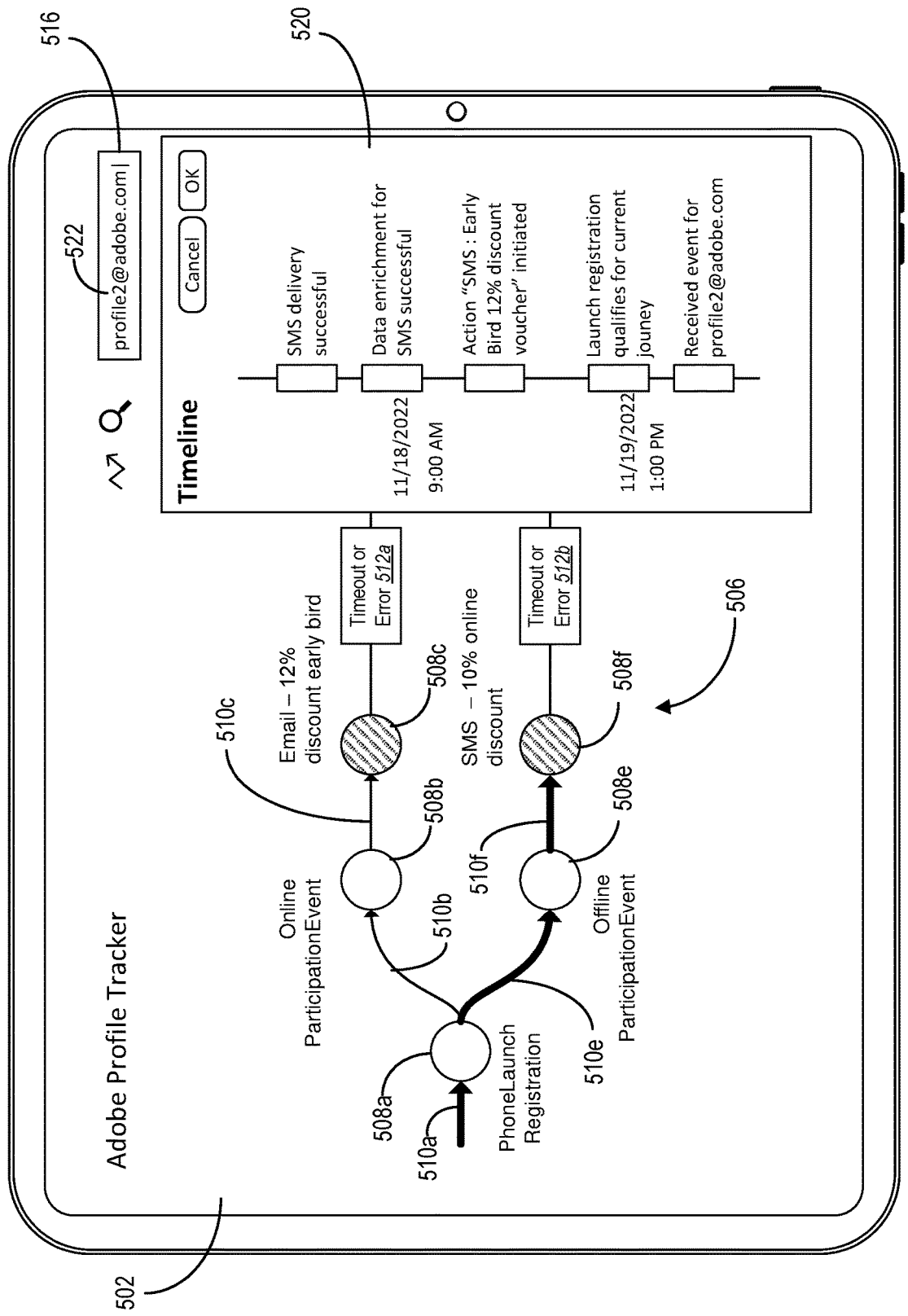

As shown in FIG. 5D, upon receiving an additional identifier 522 via the additional interactive search option 516, the profile journey visualization system 106 modifies the visual representation 506 to reflect the state of the user profile associated with the additional identifier 522. In particular, as shown, the profile journey visualization system 106 modifies one or more visual features of the edges 510*a*, 510*e*-510*f* to reflect the state of the user profile with respect to the underlying workflow journey.

As further shown in FIG. 5D, the profile journey visualization system 106 modifies the additional detail displayed within the side panel 520 to reflect additional detail corresponding to the user profile associated with the additional identifier 522. In some cases, the profile journey visualization system 106 updates the displayed additional detail automatically. In some implementations, however, the profile journey visualization system 106 updates the displayed additional detail in response to one or more user interactions with the visual representation 506 (e.g., a selection of one of the nodes 508*a*-508*f*).

In particular, the visual representation 506 and the additional detail as shown in FIG. 5D indicate that the user profile associated with the additional identifier 522 has completed the workflow journey via successful transmission of a short message service (SMS) message by the action represented by the node 508*f*. Thus, in one or more embodiments, the profile journey visualization system 106 changes the highlighted path on the visual representation 506 based on changes to the identifier that has been received.

Figure 5E:
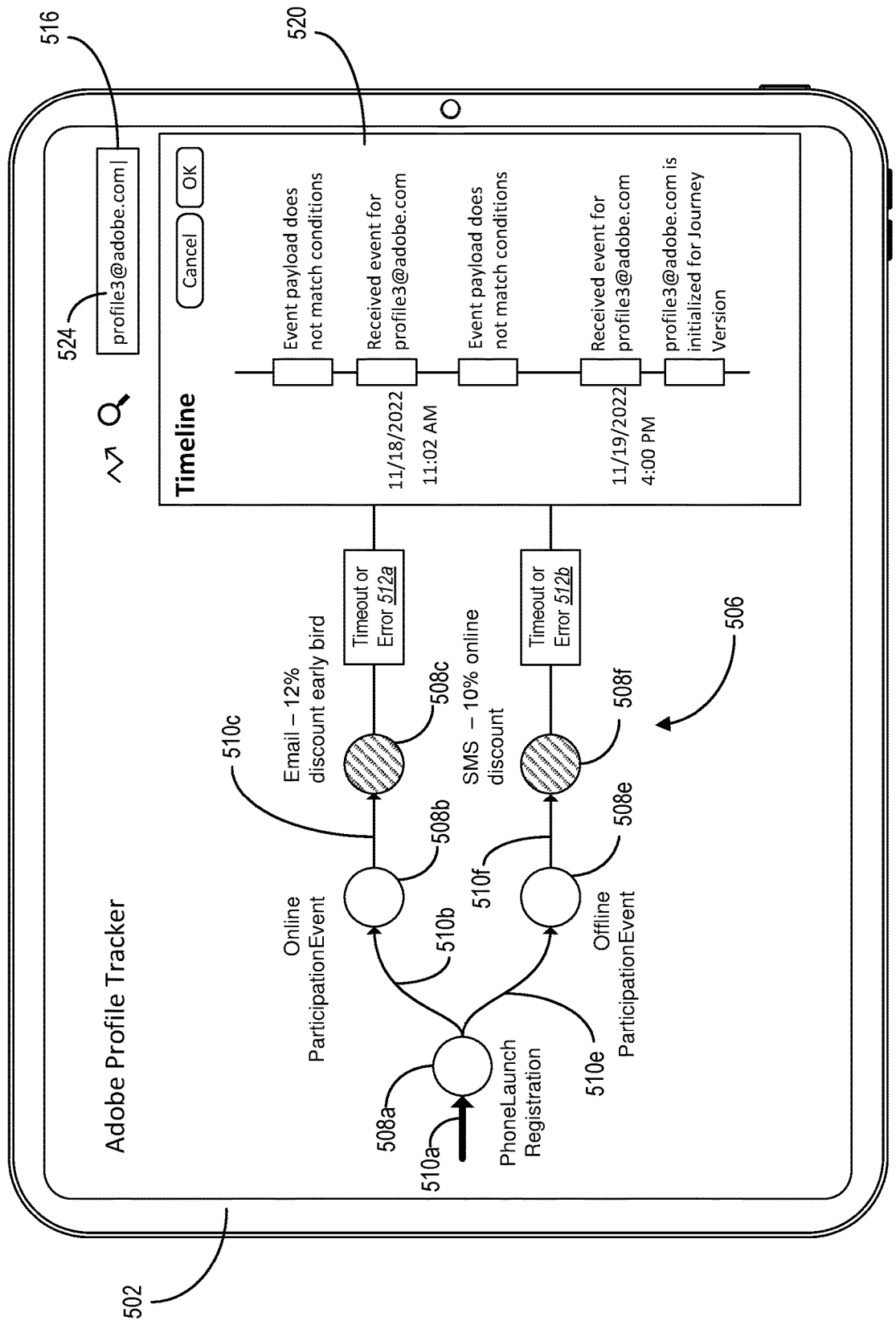

FIG. 5E similarly shows the profile journey visualization system 106 modifying the visual representation 506 within the graphical user interface 502 based on an additional identifier 524 received via the additional interactive search option 516. As shown in FIG. 5E, the profile journey visualization system 106 also updates the additional detail within the side panel 520 to reflect additional detail corresponding to the user profile associated with the additional identifier 524. In particular, the visual representation 506 and the additional detail as shown in FIG. 5E indicate that the user profile has entered into the workflow journey via the initial event associated with then node 508*a* but has yet to complete one of the subsequent events. In other words, the profile journey visualization system 106 indicates that it is awaiting completion of one of the subsequent events before the user profile advances within the workflow journey.

By collecting workflow journey data for a user profile and modifying a visual representation of a journey workflow to represent that workflow journey data, the profile journey visualization system 106 provides improved flexibility when compared to conventional systems. In particular, the profile journey visualization system 106 flexibly modifies the visual representation using data extracted with a received identifier for the user profile. Thus, the profile journey visualization system 106 offers a more flexible solution for providing a representation of the state of a user profile than many conventional systems, which rely on tedious navigation of multiple user interface, the submission of rigidly formatted executable queries, and/or engagement with the backend to identify the needed details.

Further, by receiving an identifier through a graphical user interface and presenting a visual representation of the state of a user profile within the same user interface, the profile journey visualization system 106 provides improved efficiency when compared to conventional systems. For instance, the profile journey visualization system 106 implements a consolidated graphical user interface that reduces the user interactions necessary to obtain information regarding the state of a user profile. Indeed, while many conventional systems require navigation through a plurality of separate menus, sub-menus, and or windows as well as subsequent submission of a typed query, the profile journey visualization system 106 provides a single graphical user interface that receives an identifier via reduced user interactions and response by retrieving the corresponding information and modifying the visual representation to reflect that information.

Figure 6:
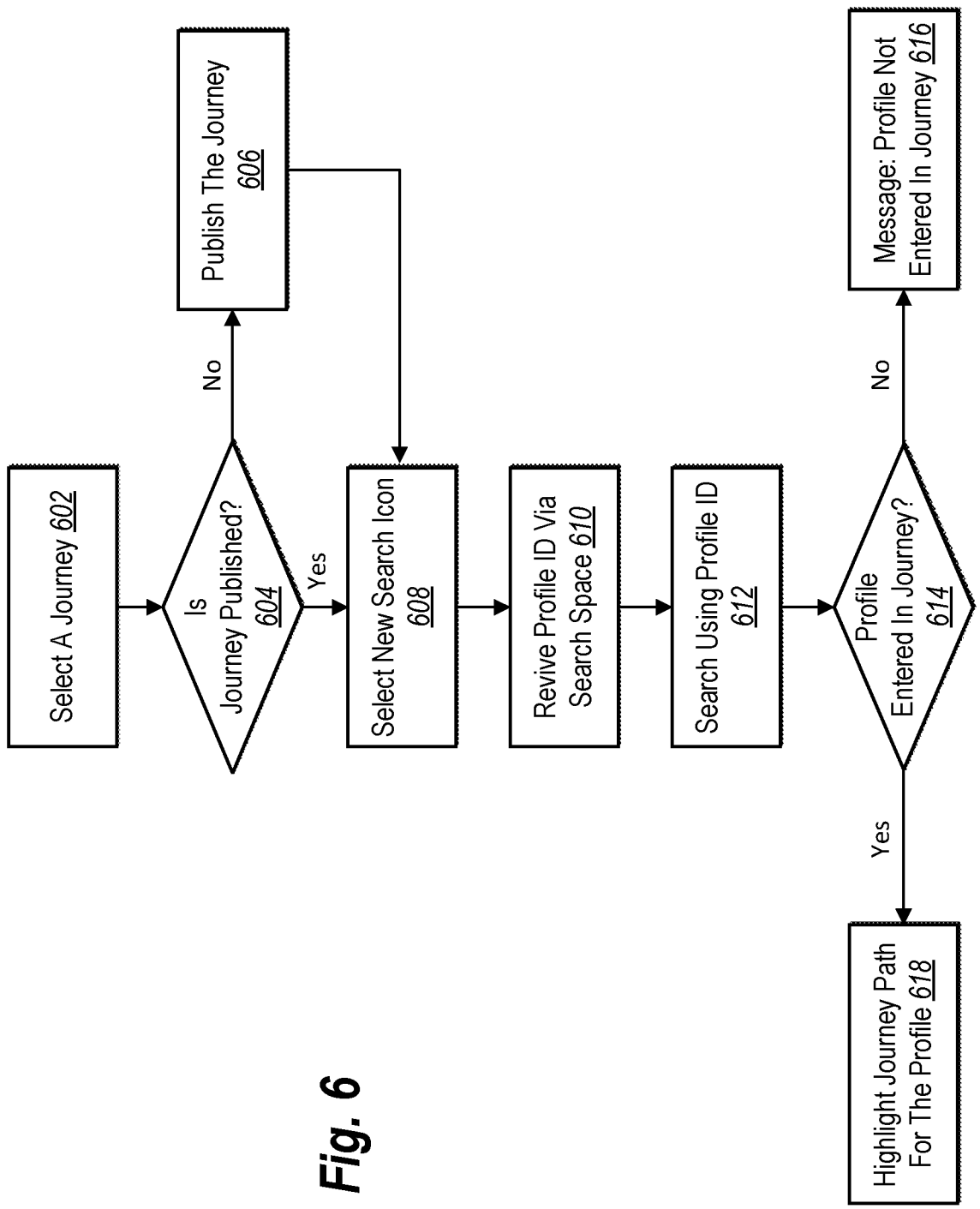
FIG. 6 illustrates a decision tree implemented by the profile journey visualization system to provide a visual representation of a state of a user profile with respect to a workflow journey in accordance with one or more embodiments.

FIG. 6 illustrates a decision tree implemented by the profile journey visualization system 106 to provide a visual representation of a state of a user profile with respect to a workflow journey in accordance with one or more embodiments. In particular, FIG. 6 illustrates acts performed detected by the profile journey visualization system 106 or performed by the profile journey visualization system 106 on an administrator device or a server device in accordance with one or more embodiments.

As shown in FIG. 6, the profile journey visualization system 106 performs an act 602 of selecting a workflow journey. For instance, in some cases, there are a plurality of workflow journeys available for selection. Accordingly, the profile journey visualization system 106 selects a workflow journey from among the plurality of workflow journeys. In some instances, the profile journey visualization system 106 selects the workflow journey in accordance with a user selection of the workflow journey detected via an administrator device.

As further shown in FIG. 6, the profile journey visualization system 106 performs an act 604 of determining whether the selected workflow journey has been published. In other words, the profile journey visualization system 106 determines whether the workflow journey has been activated so that user profiles can participate in the workflow journey. As shown, upon determining that the workflow journey has not been published, the profile journey visualization system 106 performs an act 606 of publishing the workflow journey. Upon determining that the workflow journey has been published, the profile journey visualization system 106 proceeds. In some cases, the profile journey visualization system 106 generates and/or provides a visual representation of the workflow journey within a graphical user interface displayed on the administrator device. For example, in some instances, the profile journey visualization system 106 generates and/or provides a visual representation that includes nodes and edges representing events, actions, and/or errors defined in the workflow journey.

Indeed, as shown in FIG. 6, the profile journey visualization system 106 also performs an act 608 of selecting a new search icon. In particular, in some embodiments, the profile journey visualization system 106 provides, within the graphical user interface displayed on the administrator device, an interactive search option for initiating a new search. Thus, the profile journey visualization system 106 selects the interactive search option to conduct a new search with respect to the workflow journey. In one or more embodiments, the profile journey visualization system 106 selects the interactive search option in accordance with a user selection detected via the administrator device.

As further shown in FIG. 6, the profile journey visualization system 106 performs an act 610 of reviving an identifier for a user profile via a search space. For instance, in some implementations, upon selecting the interactive search option to initiate a new search, the profile journey visualization system 106 provides an additional interactive search option—such as a search space (e.g., a text box)—for display within the graphical user interface of the client device (in some cases, the profile journey visualization system 106 provides the additional interactive search option from the beginning). Accordingly, the profile journey visualization system 106 receives the identifier via one or more user interactions with the additional interactive search option.

Additionally, as shown in FIG. 6, the profile journey visualization system 106 performs an act 612 of conducting a search using the received identifier. In particular, in some embodiments, the profile journey visualization system 106 utilizes the received identifier to retrieve a set of workflow journey data for the user profile with respect to the workflow journey. For instance, in some cases, the profile journey visualization system 106 filters workflow journey data maintained at a storage location using the received identifier to retrieve the relevant workflow journey data.

As illustrated in FIG. 6, the profile journey visualization system 106 performs an act 614 of determining whether the user profile associated with the received identifier has entered the workflow journey. Upon determining that the user profile has not entered the workflow journey the profile journey visualization system 106 performs an action 616 of providing a message to the administrator device indicating that the user profile has not entered the workflow journey. Upon determining that the user profile has entered the workflow journey, the profile journey visualization system 106 performs an act 618 of highlighting the journey path for the profile. Indeed, the profile journey visualization system 106 provides a visual representation of the state of the user profile with respect to the workflow journey, such as highlighting the path of the user profile. For instance, in one or more embodiments, the profile journey visualization system 106 modifies the visual representation of the workflow journey displayed within the graphical user interface to reflect the state of (e.g., highlight the path of) the user profile. In some cases, the profile journey visualization system 106 generates a new visual representation.

Accordingly, in one or more embodiments, the profile journey visualization system 106 generates a visual representation that reflects the experience of a user profile with respect to a workflow journey. Indeed, in some cases, the profile journey visualization system 106 maintains information regarding a plurality of user profiles with respect to a plurality of workflow journeys and so provides the visual representation to represent a particular experience for a particular user profile. Accordingly, in one or more embodiments, the algorithms and acts described with reference to FIG. 6 comprise the corresponding structure for performing a step for generating a visual representation of a state of a user profile from a plurality of user profiles with respect to a workflow journey from a plurality of workflow journeys.

Figure 7:
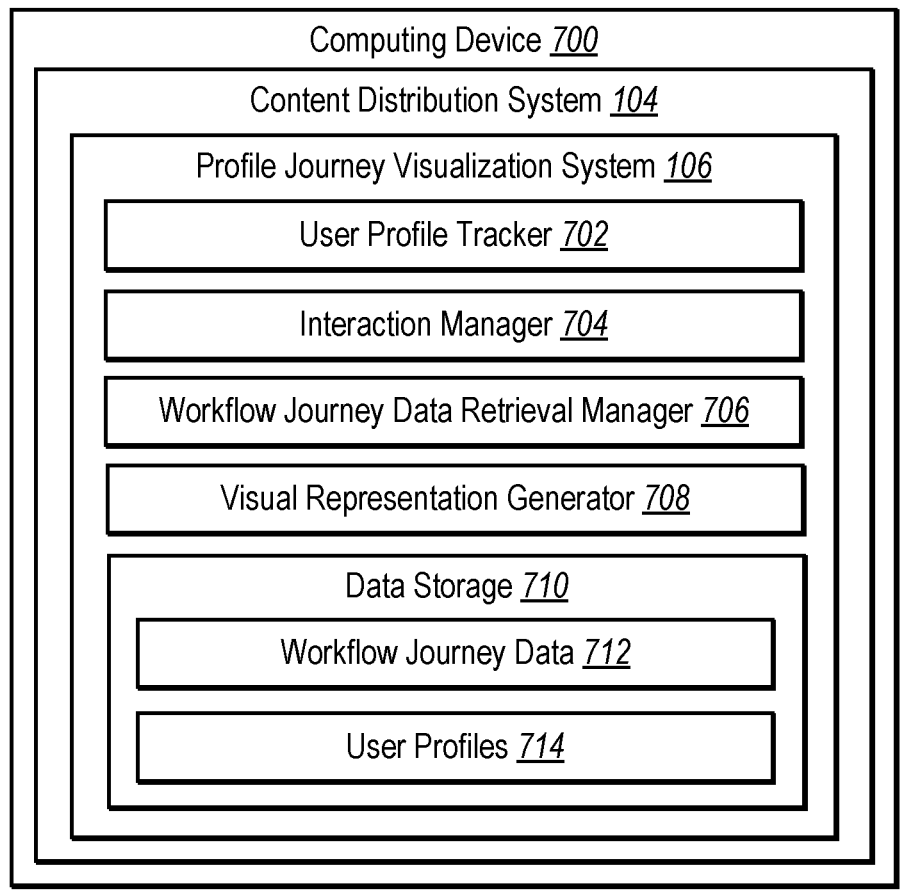
FIG. 7 illustrates an example schematic diagram of a profile journey visualization system in accordance with one or more embodiments.

Turning now to FIG. 7, additional detail will now be provided regarding various components and capabilities of the profile journey visualization system 106. In particular, FIG. 7 illustrates the profile journey visualization system 106 implemented by the computing device 700 (e.g., the server(s) 102, one of the client devices 110a-110n, and/or the administrator device 114 discussed above with reference to FIG. 1). Additionally, the profile journey visualization system 106 is also part of the content distribution system 104. As shown in FIG. 7, the profile journey visualization system 106 includes, but is not limited to, a user profile tracker 702, an interaction manager 704, a workflow journey data retrieval manager 706, a visual representation generator 708, and data storage 710 (which includes workflow journey data 712 and user profiles 714).

As just mentioned, and as illustrated in FIG. 7, the profile journey visualization system 106 includes the user profile tracker 702. In one or more embodiments, the user profile tracker 702 tracks the experience of user profiles with respect to one or more workflow journeys. In particular, in some embodiments, the profile journey visualization system 106 tracks, collects, and/or generates workflow journey data 106 for one or more user profiles with respect to one or more workflow journeys. For instance, in some implementations, the user profile tracker 702 monitors the activity of the user profile to determine events of a workflow journey that have been performed, determine actions that have been performed in response to events, and/or error that have been experienced. In some cases, the user profile tracker 702 stores the workflow journey data within a storage location.

Additionally, as shown in FIG. 7, the profile journey visualization system 106 includes the interaction manager 704. In one or more embodiments, the interaction manager 704 detects and responds to user interactions. Indeed, in some embodiments, the interaction manager 704 detects user interactions with a graphical user interface and provides responses via the graphical user interface.

Further, as shown in FIG. 7, the profile journey visualization system 106 includes the workflow journey data retrieval manager 706. In one or more embodiments, the workflow journey data retrieval manager 706 retrieves workflow journey data for user profiles. For instance, in some cases, the workflow journey data retrieval manager 706 utilizes a received identifier to retrieve workflow journey data for the associated user profile. To illustrate, in some cases, the workflow journey data retrieval manager 706 utilizes the received identifier as a filter to extract, from a storage location storing workflow journey data for a plurality of user profiles, a set of workflow journey data for the user profile. In some cases, the workflow journey data retrieval manager 706 extracts the workflow journey data that corresponds to a particular workflow journey.

As shown in FIG. 7, the profile journey visualization system 106 further includes the visual representation generator 708. In one or more embodiments, the visual representation generator 708 generates visual representations for workflow journeys. The visual representation generator 708 further provides the visual representations for display on a computing device, such as an administrator device. In some implementations, the visual representation generator 708 further modifies a display visual representation to reflect a state of a user profile with respect to the corresponding workflow journey.

As shown in FIG. 7, the profile journey visualization system 106 also includes data storage 710. In particular, data storage 710 includes workflow journey data 712 and user profiles 714. In one or more embodiments, workflow journey data 712 stores workflow journey data tracked, collected, and/or generated for user profiles with respect to workflow journeys. In some embodiments, user profiles 714 stores data related to user profiles (e.g., identifying information and demographic information).

Each of the components 702-714 of the profile journey visualization system 106 can include software, hardware, or both. For example, the components 702-714 can include one or more instructions stored on a computer-readable storage medium and executable by processors of one or more computing devices, such as a client device or server device. When executed by the one or more processors, the computer-executable instructions of the profile journey visualization system 106 can cause the computing device(s) to perform the methods described herein. Alternatively, the components 702-714 can include hardware, such as a special-purpose processing device to perform a certain function or group of functions. Alternatively, the components 702-714 of the profile journey visualization system 106 can include a combination of computer-executable instructions and hardware.

Furthermore, the components 702-714 of the profile journey visualization system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 702-714 of the profile journey visualization system 106 may be implemented as a stand-alone application, such as a desktop or mobile application. Furthermore, the components 702-714 of the profile journey visualization system 106 may be implemented as one or more web-based applications hosted on a remote server. Alternatively, or additionally, the components 702-714 of the profile journey visualization system 106 may be implemented in a suite of mobile device applications or "apps." For example, in one or more embodiments, the profile journey visualization system 106 can comprise or operate in connection with digital software applications such as ADOBE® EXPERIENCE PLATFORM or ADOBE® EXPERIENCE CLOUD®. The foregoing are either registered trademarks or trademarks of Adobe Inc. in the United States and/or other countries.

Figure 8:
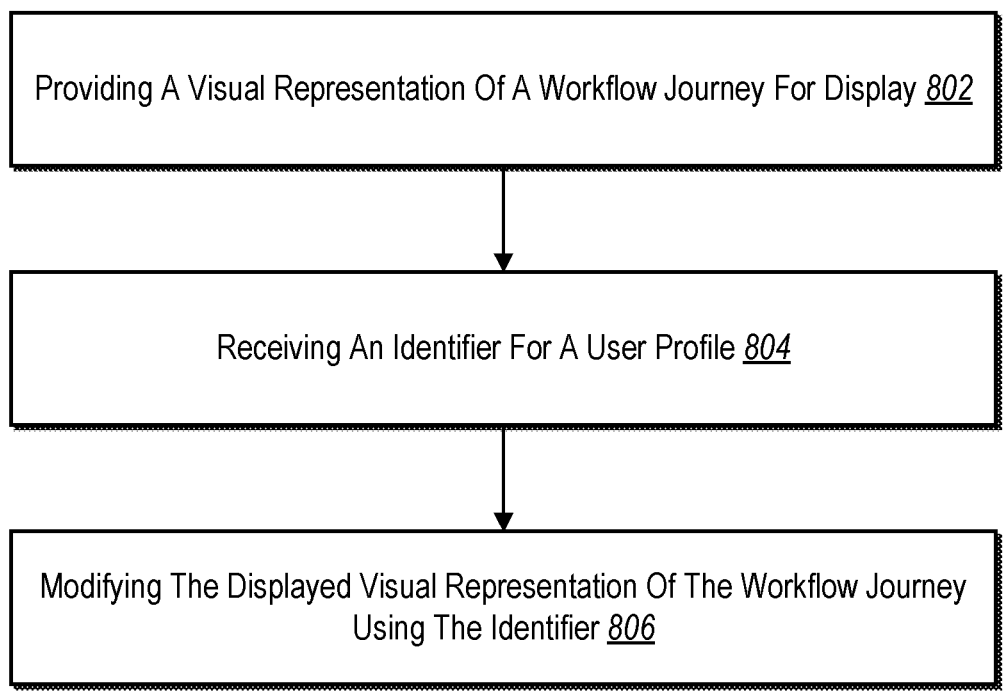
FIG. 8 illustrates a flowchart of a series of acts for generating a visual representation of a state of a user profile with respect to a workflow journey in accordance with one or more embodiments.

FIGS. 1-7, the corresponding text, and the examples provide a number of different methods, systems, devices, and non-transitory computer-readable media of the profile journey visualization system 106. In addition to the foregoing, one or more embodiments can also be described in terms of flowcharts comprising acts for accomplishing the particular result, as shown in FIG. 8. FIG. 8 may be performed with more or fewer acts. Further, the acts may be performed in different orders. Additionally, the acts described herein may be repeated or performed in parallel with one another or in parallel with different instances of the same or similar acts.

FIG. 8 illustrates a flowchart of a series of acts 800 for generating a visual representation of a state of a user profile with respect to a workflow journey in accordance with one or more embodiments. FIG. 8 illustrates acts according to one embodiment, alternative embodiments may omit, add to, reorder, and/or modify any of the acts shown in FIG. 8. In some implementations, the acts of FIG. 8 are performed as part of a computer-implemented method. Alternatively, a non-transitory computer-readable medium can store instructions thereon that, when executed by at least one processor, cause the at least one processor to perform operations comprising the acts of FIG. 8. In some embodiments, a system performs the acts of FIG. 8. For example, in one or more embodiments, a system includes at least one memory device comprising workflow journey data for a plurality of user profiles with respect to one or more workflow journeys. The system further includes at least one processor configured to cause the system to perform the acts of FIG. 8.

The series of acts 800 includes an act 802 for providing a visual representation of a workflow journey for display. For instance, in one or more embodiments, the act 802 involves providing, for display within a graphical user interface of a client device (e.g., an administrator device), a visual representation of a workflow journey comprising a plurality of nodes and one or more edges connecting the plurality of nodes. In some instances, providing the visual representation of the workflow journey comprising the plurality of nodes and the one or more edges comprises providing a plurality of visual representations for a plurality of paths of the workflow journey, each path comprising one or more nodes and at least one edge connecting the one or more nodes.

In one or more embodiments, the profile journey visualization system 106 generates the visual representation of the workflow journey by generating an event node corresponding to activity of one or more user profiles, an action node corresponding to a response to the activity of the one or more user profiles, and an edge that connects the event node and the action node.

The series of acts 800 also includes an act 804 of receiving an identifier for a user profile. For example, in one or more embodiments, the act 804 involves receiving, via the graphical user interface of the client device, an identifier associated with a user profile.

In one or more embodiments, the profile journey visualization system 106 provides, for simultaneous display with the visual representation of the workflow journey within the graphical user interface, an interactive search option for searching for one or more user profiles. Accordingly, in some cases, receiving the identifier associated with the user profile via the graphical user interface comprises receiving the identifier via the interactive search option.

Further, the series of acts 800 includes an act 806 of modifying the displayed visual representation of the workflow journey using the identifier. To illustrate, in one or more embodiments, the act 806 involves modifying, within the graphical user interface of the client device, the visual representation of the workflow journey to reflect a state of the user profile with respect to the workflow journey. In some instances, modifying the visual representation of the workflow journey to reflect the state of the user profile with respect to the workflow journey comprises modifying at least one visual representation from the plurality of visual representations to reflect a path from the plurality of paths that is associated with the user profile.

In one or more embodiments, modifying the visual representation of the workflow journey to reflect the state of the user profile with respect to the workflow journey comprises modifying one or more visual features of at least one edge of the visual representation to reflect the state of the user profile.

In some cases, the profile journey visualization system 106 further detects, via the graphical user interface of the client device, a selection of a node from the visual representation that has been modified to reflect the state of the user profile; and provides, in response to the selection of the node, additional detail regarding the state of the user profile with respect to the workflow journey for display within the graphical user interface. In some implementations, providing the additional detail regarding the state of the user profile with respect to the workflow journey for display within the graphical user interface comprises: determining an error associated with progression of the user profile with respect to the workflow journey; and providing detail regarding the error for display within the graphical user interface.

In some embodiments, the series of acts 800 further includes acts for tracking and maintaining workflow journey data for the user profile. For example, in some cases, the acts include determining workflow journey data for a plurality of user profiles with respect to the workflow journey; and maintaining the workflow journey data for the plurality of user profiles within a storage location. Accordingly, in some implementations, the profile journey visualization system 106 retrieves a set of workflow journey data corresponding to the user profile with respect to the workflow journey by filtering the workflow journey data maintained at the storage location using the identifier associated with the user profile. Thus, modifying the visual representation of the workflow journey comprises modifying the visual representation using the set of workflow journey data corresponding to the user profile.

To provide an illustration, in one or more embodiments, the profile journey visualization system 106 generates, for display within a graphical user interface of a client device, a visual representation of a workflow journey comprising a plurality of nodes and one or more edges connecting the plurality of nodes; receives, via the graphical user interface of the client device, an identifier associated with a user profile; determines a set of workflow journey data associated with the user profile with respect to the workflow journey by filtering the workflow journey data for the plurality of user profiles using the identifier; and modifies, within the graphical user interface of the client device, the visual representation of the workflow journey to reflect a path of the user profile on the workflow journey.

In some cases, the profile journey visualization system 106 generates the visual representation of the workflow journey by generating a plurality of visual representations for a plurality of paths of the workflow journey; and modifies the visual representation of the workflow journey to reflect the path of the user profile on the workflow journey by modifying at least one visual representation of the plurality of visual representations to visually highlight the path of the user profile. In some instances, the profile journey visualization system 106 further associates the set of workflow journey data for the user profile with the identifier for the user profile. Accordingly, the profile journey visualization system 106 determines the set of workflow journey data associated with the user profile by filtering the workflow journey data using the identifier by determining the set of workflow journey data based on determining an association of the set of workflow journey data with the identifier for the user profile.

In one or more embodiments, the profile journey visualization system 106 receives, via the graphical user interface of the client device, the identifier associated with the user profile by receiving, via an interactive search option displayed within the graphical user interface, an email address associated with the user profile. In some implementations, the profile journey visualization system 106 generates the visual representation of the workflow journey by generating the visual representation to include a visual indication of a potential error associated with progression with respect to the workflow journey; and modifies the visual representation of the workflow journey to reflect the path of the user profile on the workflow journey by modifying the visual representation to indicate that the user profile encountered the potential error.

In some instances, the profile journey visualization system 106 further detects, via the graphical user interface of the client device, a selection of a node from the plurality of nodes of the visual representation; and provides, in response to the selection of the node, additional detail corresponding to a set of nodes from the path of the user profile for display within the graphical user interface. In some cases, the profile journey visualization system 106 provides the additional detail corresponding to the set of nodes from the path of the user profile for display within the graphical user interface by overlaying a portion of the graphical user interface with a side panel that displays the additional detail corresponding to the set of nodes while maintaining presentation of the visual representation of the workflow journey within the graphical user interface.

In some embodiments, the profile journey visualization system 106 further receives, via the graphical user interface of the client device, an additional identifier associated with an additional user profile; and modifies, within the graphical user interface of the client device, the visual representation of the workflow journey to reflect an additional path of the additional user profile on the workflow journey.

To provide another illustration, in one or more embodiments, the profile journey visualization system 106 stores workflow journey data for a plurality of user profiles with respect to a plurality of workflow journeys. The profile journey visualization system 106 also generates a visual representation that reflects a state of one of the user profiles with respect to one of the workflow journeys. Further, the profile journey visualization system 106 provides the visual representation of the state of the user profile with respect to the workflow journey for display within a graphical user interface of a client device.

In some cases, the profile journey visualization system 106 further tracks a progression of a user profile with respect to a workflow journey by monitoring activity of the user profile and at least one action corresponding to a response to the activity in accordance with the workflow journey. Accordingly, in some instances, the profile journey visualization system 106 stores the workflow journey data for the plurality of user profiles with respect to the plurality of workflow journeys by storing a set of workflow data corresponding to the activity of the user profile and the at least one action corresponding to the response to the activity. In some embodiments, monitoring the at least one action corresponding to the response to the activity in accordance with the workflow journey comprises monitoring a communication comprising digital content transmitted to an additional client device associated with the user profile.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
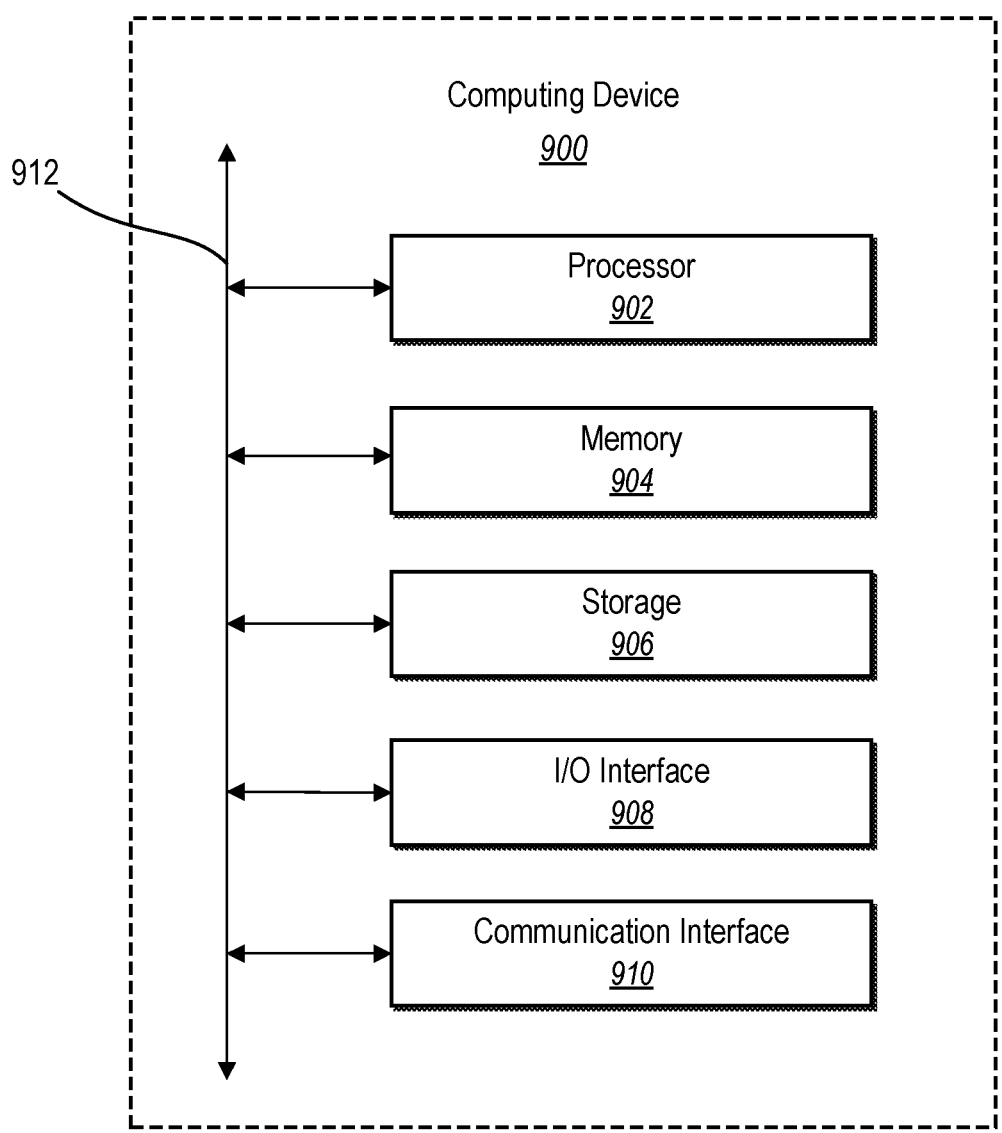
FIG. 9 illustrates a block diagram of an exemplary computing device in accordance with one or more embodiments.

FIG. 9 illustrates a block diagram of an example computing device 900 that may be configured to perform one or more of the processes described above. One will appreciate that one or more computing devices, such as the computing device 900 may represent the computing devices described above (e.g., the server(s) 102, the client devices 110a-110n, and/or the administrator device 114). In one or more embodiments, the computing device 900 may be a mobile device (e.g., a mobile telephone, a smartphone, a PDA, a tablet, a laptop, a camera, a tracker, a watch, a wearable device). In some embodiments, the computing device 900 may be a non-mobile device (e.g., a desktop computer or another type of client device). Further, the computing device 900 may be a server device that includes cloud-based processing and storage capabilities.

As shown in FIG. 9, the computing device 900 can include one or more processor(s) 902, memory 904, a storage device 906, input/output interfaces 908 (or "I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other embodiments. Furthermore, in certain embodiments, the computing device 900 includes fewer components than those shown in FIG. 9. Components of the computing device 900 shown in FIG. 9 will now be described in additional detail.

In particular embodiments, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 including storage for storing data or instructions. As an example, and not by way of limitation, the storage device 906 can include a non-transitory storage medium described above. The storage device 906 may include a hard disk drive (HDD), flash memory, a Universal Serial Bus (USB) drive or a combination these or other storage devices.

As shown, the computing device 900 includes one or more I/O interfaces 908, which are provided to allow a user to provide input to (such as user strokes), receive output from, and otherwise transfer data to and from the computing device 900. These I/O interfaces 908 may include a mouse, keypad or a keyboard, a touch screen, camera, optical scanner, network interface, modem, other known 110 devices or a combination of such I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 908 are configured to provide graphical data to a display for presentation to a user. The graphical data may be representative of one or more graphical user interfaces and/or any other graphical content as may serve a particular implementation.

The computing device 900 can further include a communication interface 910. The communication interface 910 can include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 can further include a bus 912. The bus 912 can include hardware, software, or both that connects components of computing device 900 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause the at least one processor to perform operations comprising:
   determining an association between a set of workflow journey data corresponding to a workflow journey and a user profile, the set of workflow journey data included in workflow journey data stored for a plurality of user profiles with respect to the workflow journey;
   providing, for display within a graphical user interface of a client device, a visual representation of a workflow journey comprising a plurality of nodes and one or more edges connecting the plurality of nodes;
   receiving, via the graphical user interface of the client device, an identifier associated with the user profile;
   filtering, using the identifier, the workflow journey data stored for the plurality of user profiles to determine the set of workflow journey data that is associated with the user profile; and
   modifying, within the graphical user interface of the client device, the visual representation of the workflow journey to reflect a state of the user profile with respect to the workflow journey based on the set of workflow journey data that is associated with the user profile.

2. The non-transitory computer-readable medium of claim 1, wherein modifying the visual representation of the workflow journey to reflect the state of the user profile with respect to the workflow journey comprises modifying one or more visual features of at least one edge of the visual representation to reflect the state of the user profile.

3. The non-transitory computer-readable medium of claim 1, wherein:
   providing the visual representation of the workflow journey comprising the plurality of nodes and the one or more edges comprises providing a plurality of visual representations for a plurality of paths of the workflow journey, each path comprising one or more nodes and at least one edge connecting the one or more nodes; and
   modifying the visual representation of the workflow journey to reflect the state of the user profile with respect to the workflow journey comprises modifying at least one visual representation from the plurality of visual representations to reflect a path from the plurality of paths that is associated with the user profile.

4. The non-transitory computer-readable medium of claim 1, further comprising instructions that, when executed by the at least one processor, cause the at least one processor to perform operations comprising generating the visual representation of the workflow journey by generating an event node corresponding to activity of one or more user profiles, an action node corresponding to a response to the activity of the one or more user profiles, and an edge that connects the event node and the action node.

5. The non-transitory computer-readable medium of claim 1, further comprising instructions that, when executed by the at least one processor, cause the at least one processor to perform operations comprising:
determining the workflow journey data for the plurality of user profiles with respect to the workflow journey; and
maintaining the workflow journey data for the plurality of user profiles within a storage location.

6. The non-transitory computer-readable medium of claim 5,
wherein determining the association between the set of workflow journey data and the user profile comprises associating the set of workflow journey data with the identifier for the user profile.

7. The non-transitory computer-readable medium of claim 1, further comprising instructions that, when executed by the at least one processor, cause the at least one processor to perform operations comprising:
detecting, via the graphical user interface of the client device, a selection of a node from the visual representation that has been modified to reflect the state of the user profile; and
providing, in response to the selection of the node, additional detail regarding the state of the user profile with respect to the workflow journey for display within the graphical user interface.

8. The non-transitory computer-readable medium of claim 7, wherein providing the additional detail regarding the state of the user profile with respect to the workflow journey for display within the graphical user interface comprises:
determining an error associated with progression of the user profile with respect to the workflow journey; and
providing detail regarding the error for display within the graphical user interface.

9. The non-transitory computer-readable medium of claim 1,
further comprising instructions that, when executed by the at least one processor, cause the at least one processor to perform operations comprising providing, for simultaneous display with the visual representation of the workflow journey within the graphical user interface, an interactive search option for searching for one or more user profiles,
wherein receiving the identifier associated with the user profile via the graphical user interface comprises receiving the identifier via the interactive search option.

10. A system comprising:
at least one memory device; and
at least one processor configured to cause the system to:
determine an association between a set of workflow journey data corresponding to a workflow journey and an identifier for a user profile, the set of workflow journey data included in workflow journey data stored for a plurality of user profiles with respect to the workflow journey;
generate, for display within a graphical user interface of a client device, a visual representation of the workflow journey comprising a plurality of nodes and one or more edges connecting the plurality of nodes;
receive, via the graphical user interface of the client device, the identifier associated with the user profile;
determine the set of workflow journey data that is associated with the user profile with respect to the workflow journey by filtering the workflow journey data for the plurality of user profiles using the identifier to determine that the set of workflow journey data is associated with the identifier for the user profile; and
modify, within the graphical user interface of the client device, the visual representation of the workflow journey to reflect a path of the user profile on the workflow journey.

11. The system of claim 10, wherein the at least one processor is configured to cause the system to:
generate the visual representation of the workflow journey by generating a plurality of visual representations for a plurality of paths of the workflow journey; and
modify the visual representation of the workflow journey to reflect the path of the user profile on the workflow journey by modifying at least one visual representation of the plurality of visual representations to visually highlight the path of the user profile.

12. The system of claim 10, wherein:
the at least one processor is configured to cause the system to determine the association between the set of workflow journey data and the identifier for the user profile by associating the set of workflow journey data with an email address or phone number associated with the user profile.

13. The system of claim 10, wherein the at least one processor is configured to cause the system to receive, via the graphical user interface of the client device, the identifier associated with the user profile by receiving, via an interactive search option displayed within the graphical user interface, an email address associated with the user profile.

14. The system of claim 10, wherein the at least one processor is configured to cause the system to:
generate the visual representation of the workflow journey by generating the visual representation to include a visual indication of a potential error associated with progression with respect to the workflow journey; and
modify the visual representation of the workflow journey to reflect the path of the user profile on the workflow journey by modifying the visual representation to indicate that the user profile encountered the potential error.

15. The system of claim 10, wherein the at least one processor is further configured to cause the system to:
detect, via the graphical user interface of the client device, a selection of a node from the plurality of nodes of the visual representation; and
provide, in response to the selection of the node, additional detail corresponding to a set of nodes from the path of the user profile for display within the graphical user interface.

16. The system of claim 15, wherein the at least one processor is configured to cause the system to provide the additional detail corresponding to the set of nodes from the path of the user profile for display within the graphical user interface by overlaying a portion of the graphical user interface with a side panel that displays the additional detail corresponding to the set of nodes while maintaining presentation of the visual representation of the workflow journey within the graphical user interface.

17. The system of claim 10, wherein the at least one processor is further configured to cause the system to:
- receive, via the graphical user interface of the client device, an additional identifier associated with an additional user profile; and
- modify, within the graphical user interface of the client device, the visual representation of the workflow journey to reflect an additional path of the additional user profile on the workflow journey.

18. A computer-implemented method comprising:
- determining an association between a set of workflow journey data corresponding to a workflow journey and a user profile, the set of workflow journey data included in workflow journey data stored for a plurality of user profiles with respect to the workflow journey;
- providing, for display within a graphical user interface of a client device, a visual representation of a workflow journey comprising a plurality of nodes and one or more edges connecting the plurality of nodes;
- receiving, via the graphical user interface of the client device, an identifier associated with the user profile;
- filtering, using the identifier, the workflow journey data stored for the plurality of user profiles to determine the set of workflow journey data that is associated with the user profile; and
- modifying, within the graphical user interface of the client device, the visual representation of the workflow journey to reflect a state of the user profile with respect to the workflow journey based on the set of workflow journey data that is associated with the user profile.

19. The computer-implemented method of claim 18,
- further comprising tracking a progression of the user profile with respect to the workflow journey by monitoring activity of the user profile and at least one action corresponding to a response to the activity in accordance with the workflow journey,
- wherein storing the workflow journey data for the plurality of user profiles with respect to workflow journeys comprises storing the set of workflow journey data corresponding to the activity of the user profile and the at least one action corresponding to the response to the activity.

20. The computer-implemented method of claim 19, wherein monitoring the at least one action corresponding to the response to the activity in accordance with the workflow journey comprises monitoring a communication comprising digital content transmitted to an additional client device associated with the user profile.

* * * * *